(12) United States Patent  
Qin et al.

(10) Patent No.: US 10,863,077 B2
(45) Date of Patent: Dec. 8, 2020

(54) IMAGE PHOTOGRAPHING METHOD, APPARATUS, AND TERMINAL

(71) Applicant: Huawei Technologies Co., Ltd., Shenzhen (CN)

(72) Inventors: Chao Qin, Beijing (CN); Wenmei Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/332,701

(22) PCT Filed: Sep. 12, 2016

(86) PCT No.: PCT/CN2016/098751
§ 371 (c)(1),
(2) Date: Mar. 12, 2019

(87) PCT Pub. No.: WO2018/045592
PCT Pub. Date: Mar. 15, 2018

(65) Prior Publication Data
US 2019/0222744 A1 Jul. 18, 2019

(51) Int. Cl.
*H04N 5/232* (2006.01)
*G06K 9/32* (2006.01)
(Continued)

(52) U.S. Cl.
CPC ....... *H04N 5/23212* (2013.01); *G06F 9/3004* (2013.01); *G06K 9/32* (2013.01);
(Continued)

(58) Field of Classification Search
CPC ......... H04N 5/23212; H04N 5/232133; H04N 5/2356; H04N 5/23229
(Continued)

(56) References Cited

U.S. PATENT DOCUMENTS 9,160,946 B1 * 10/2015 Semenov ............... H04N 5/357
2002/0075389 A1 * 6/2002 Seeger .................. H04N 5/232
348/222.1
(Continued)

FOREIGN PATENT DOCUMENTS

| CN | 101634795 A | 1/2010 |
| CN | 101996392 A | 3/2011 |

(Continued)

*Primary Examiner* — Anthony J Daniels
(74) *Attorney, Agent, or Firm* — Slater Matsil, LLP

(57) ABSTRACT

An image photographing method is provided, including: based on a photographing instruction, selecting at least one focus in a quadrangular image, and photographing at least one initial image based on the at least one focus, where the quadrangular image includes a first pair of opposite sides and a second pair of opposite sides, an included angle between the opposite sides of the first pair of opposite sides is less than that of the second pair of opposite sides, a first side is a shorter side of the first pair of opposite sides, the at least one focus includes a first focus, and the first focus is in the quadrangular image and in a partial region including the first side; adjusting a quadrangular image to a rectangular image; and obtaining a final image and outputting the final image.

20 Claims, 23 Drawing Sheets

(51) Int. Cl.
*H04N 5/262* (2006.01)
*H04N 1/387* (2006.01)
*H04N 5/225* (2006.01)
*G06F 9/30* (2018.01)

(52) U.S. Cl.
CPC ........... G06K 9/3233 (2013.01); H04N 1/387 (2013.01); H04N 5/2258 (2013.01); H04N 5/232 (2013.01); H04N 5/23229 (2013.01); H04N 5/23232 (2013.01); H04N 5/23238 (2013.01); H04N 5/23245 (2013.01); H04N 5/2628 (2013.01)

(58) Field of Classification Search
USPC .......................................................... 348/345
See application file for complete search history.

(56) References Cited

U.S. PATENT DOCUMENTS

| | | | |
|---|---|---|---|
| 2006/0210192 A1* | 9/2006 | Orhun | G06K 9/32 382/275 |
| 2006/0222260 A1* | 10/2006 | Sambongi | G06T 5/006 382/274 |
| 2008/0187242 A1 | 8/2008 | Kondo | |
| 2011/0032570 A1 | 2/2011 | Imaizumi et al. | |
| 2012/0113489 A1* | 5/2012 | Heit | G06K 9/186 358/518 |
| 2013/0051610 A1* | 2/2013 | Roach | G06Q 20/042 382/100 |
| 2013/0342723 A1* | 12/2013 | Ishii | H04N 5/232 348/222.1 |
| 2015/0139499 A1* | 5/2015 | Shimizu | G06T 5/50 382/104 |
| 2015/0358542 A1* | 12/2015 | Sato | H04N 5/265 348/239 |
| 2016/0119534 A1 | 4/2016 | Han et al. | |
| 2017/0347031 A1* | 11/2017 | Ajito | H04N 5/23212 |

FOREIGN PATENT DOCUMENTS

| | | |
|---|---|---|
| CN | 103703757 A | 4/2014 |
| CN | 104735350 A | 6/2015 |
| CN | 105574813 A | 5/2016 |

* cited by examiner

|  |  |
|---|---|
| 10 | 20 |
| 30 | 40 |

(a)

| 10 |  | 20 |
|---|---|---|
|  |  |  |
| 30 |  | 40 |

(b)

| a | b | c |
|---|---|---|
| d | e | f |
| g | h | i |

(c)

| 10 | 15 | 20 |
|---|---|---|
| 20 | 25 | 30 |
| 30 | 35 | 40 |

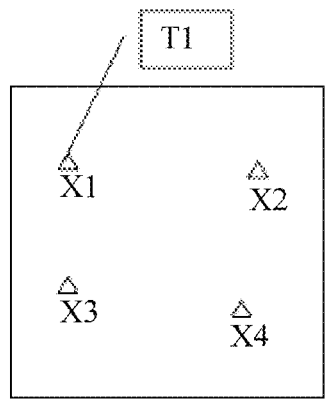 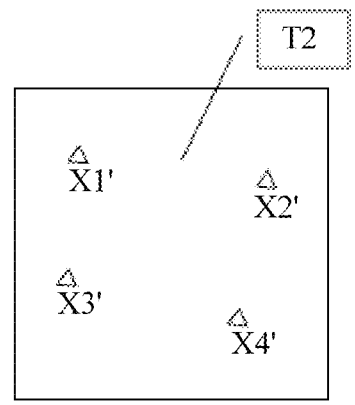
FIG. 13a　　　　　　　FIG. 13b
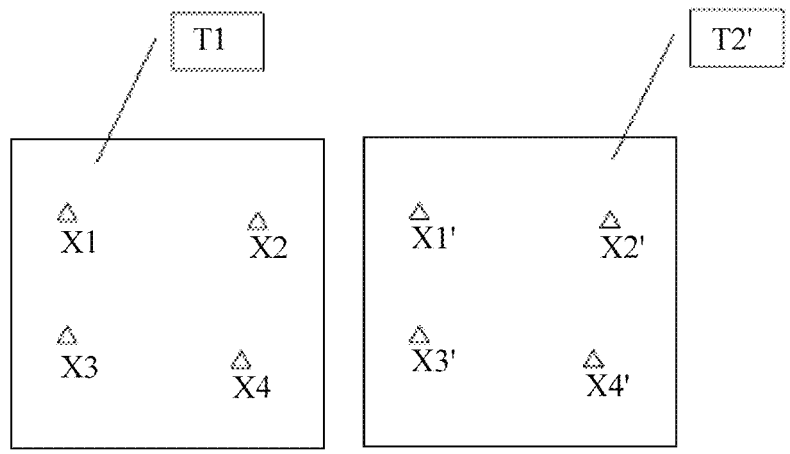
FIG. 13c (a) (b)

IMAGE PHOTOGRAPHING METHOD, APPARATUS, AND TERMINAL

CROSS-REFERENCE TO RELATED APPLICATIONS

This application is a national stage of International Application No. PCT/CN2016/098751, filed on Sep. 12, 2016, which is hereby incorporated by reference in its entirety.

TECHNICAL FIELD

The present invention relates to the computer field, and in particular, to an image photographing method, apparatus, and terminal.

BACKGROUND

In recent years, photographing functions of mobile phones or smart cameras are developing rapidly, and diverse novel photographing technologies emerge, such as panoramic photography, an all-focus mode, and document correction.

With reference to FIG. 1, an existing document correction solution includes the following steps: Step S1: A camera focuses on a center of vision and takes a photograph. Generally, a point focused on is a default image center. Step S2: A processor obtains the photograph, and detects locations of sides or angles of a quadrangular image in the photograph. Step S3: The processor maps a detected pixel in the quadrangular image to a rectangular target region based on a preset aspect ratio of the rectangle. A newly added pixel during a mapping process is obtained through interpolation by using an existing pixel in an original image. Step S4: Generate a new corrected image based on the adjusted pixel in the rectangle, and output and store the new image.

In the prior art, when a corrected rectangular document does not impose a high requirement on image precision, keystone distortion can be effectively resolved and practicability is quite desirable, but this is inappropriate for an application that imposes a relatively high requirement on image precision.

FIG. 2 is a schematic diagram of imaging abstraction of obliquely photographing a rectangular target. During a photographing process, with reference to FIG. 2, there is a rectangular target on an object plane W; when a photographing device observes the rectangular target, there is an oblique angle α between the object plane W and an imaging plane C, and an image, of the rectangular target, formed on the imaging plane C is a quadrangular image.

When the oblique angle α between the object plane W and the imaging plane C is excessively large, not all parts of the rectangular target are within a range of a depth of field of a lens. Consequently, a part, near a focus, of the quadrangular image is clear, and a part far away from the focus is blurry. At a stage of performing keystone correction on the quadrangular image to obtain a corrected rectangular image, if the rectangular target tilts relatively sharply, a partial region of the rectangular image corresponding to a far end of the rectangular target needs more interpolation pixels compared with a partial region of the rectangular image corresponding to a near end. However, a resolution at the far end of an initial photographed image is usually low, and an information source is not enough during an interpolation process at the keystone correction stage, resulting in an obvious decrease in a definition of a partial region in the image on which keystone correction is performed. FIG. 4 is a schematic diagram of a target image obtained after rectangle correction is performed on an initial image obtained in FIG. 3. Specifically, with reference to FIG. 4, when the actual rectangular target is photographed, a definition of a target image portion A corresponding to the far end is relatively low and is obviously lower than that of a target image portion B corresponding to the near end.

As a result, a corrected rectangular document has the following prior-art problem: A definition of one side of a quadrangle is obviously lower than that of another side of the quadrangle, and even words are blurry. This cannot achieve an objective of document correction, and therefore user experience is poor.

SUMMARY

Embodiments of the present invention provide an image photographing method, apparatus, and terminal, so as to resolve a prior-art problem that a partial definition of a corrected rectangular document is relatively low and user experience is poor.

According to a first aspect, some embodiments of the present invention provide an image photographing method for a terminal with a camera, where the method includes: entering a photographing mode, and detecting a quadrangular image in a preview image; based on a photographing instruction, selecting at least one focus in the quadrangular image, and photographing at least one initial image based on the at least one focus, where the quadrangular image includes a first pair of opposite sides and a second pair of opposite sides, an included angle between the opposite sides of the first pair of opposite sides is less than that of the second pair of opposite sides, a first side is a shorter side of the first pair of opposite sides, the at least one focus includes a first focus, and the first focus is in the quadrangular image and in a partial region including the first side; adjusting a quadrangular image in each of the at least one initial image to a rectangular image; and obtaining a final image based on the rectangular image and outputting the final image.

According to some embodiments, in the method, the point in the region including the first side corresponding to a far end of the photographed rectangular target is selected as the focus for photographing the initial image, so that a resolution of the partial region in the initial image corresponding to the far end of the rectangular target can be increased. This increases a source pixel for correction interpolation of the partial region during a correction process, and can increase a definition of the photographed image.

In some specific implementations, the step of selecting at least one focus in the quadrangular image, and photographing at least one initial image based on the at least one focus includes: selecting the first focus in the quadrangular image, and photographing an initial image based on the first focus.

In some specific implementations, the step of selecting the first focus in the quadrangular image includes: determining a first point and a second point respectively on a second side and a third side of the quadrangular image, where the second side and the third side are adjacent to the first side, a distance between the first point and a vertex at which the first side and the second side intersect is less than or equal to a distance between the first point and a vertex at which the second side and a fourth side intersect, a distance between the second point and a vertex at which the first side and the third side intersect is less than or equal to a distance between the second point and a vertex at which the third side and the fourth side intersect, and the fourth side is an opposite side of the first side; determining, as the partial region including the first side, a first region formed by connecting the vertex at which the first side and the second side intersect, the vertex at which the first side and the third side intersect, the second point, and the first point in order; and selecting a point in the first region as the first focus.

In some specific implementations, the step of selecting a point in the first region as the first focus includes either of the following: selecting an intersection point of diagonals of the first region as the first focus; or selecting an intersection point of lines connecting midpoints of opposite sides of the first region as the first focus.

In some specific implementations, the step of selecting a point in the first region as the first focus includes any one of the following: selecting, as the first focus, a point determined dynamically based on luminance distribution in the first region; selecting, as the first focus, a point determined dynamically based on a to-be-tracked target in the first region; or selecting, as the first focus, a center of gravity determined based on uneven density distribution in the first region.

In some specific implementations, the selecting, as the first focus, a center of gravity determined based on uneven density distribution in the first region includes: detecting the quadrangular image in the preview image; allocating different densities for different parts of the quadrangular image based on an oblique photographing angle of the quadrangular image, where a density proportion is set to be inversely proportional to a length of a side of a tangent plane; and computing the center of gravity of the quadrangular image based on the density proportion and an area of the quadrangular image, and using the center of gravity as the first focus.

In some specific implementations, the step of obtaining a final image based on the rectangular image outputting the final image includes: outputting the rectangular image as the final image.

In some specific implementations, the step of selecting at least one focus in the quadrangular image, and photographing at least one initial image based on the at least one focus includes: selecting at least two focuses in the quadrangular image, where the at least two focuses include at least one first focus and at least one second focus, and the second focus is different from the first focus; and photographing at least two initial images based on the at least two focuses respectively.

In some specific implementations, the second focus is a point selected in a partial region including an opposite side of the first side in the quadrangular image.

In some specific implementations, a method for selecting the second focus includes: determining a third point and a fourth point respectively on a second side and a third side of the quadrangular image, where the second side and the third side are adjacent to the first side, a distance between the third point and a vertex at which the first side and the second side intersect is greater than or equal to a distance between the third point and a vertex at which the second side and a fourth side intersect, a distance between the fourth point and a vertex at which the first side and the third side intersect is greater than or equal to a distance between the fourth point and a vertex at which the third side and the fourth side intersect, and the fourth side is an opposite side of the first side; determining, as the partial region including the opposite side of the first side, a second region formed by connecting the vertex at which the fourth side and the second side intersect, the vertex at which the fourth side and the third side intersect, the fourth point, and the third point in order; and selecting a point in the second region as the second focus.

In some specific implementations, the step of adjusting a quadrangular image in each of the at least one initial image to a rectangular image includes: adjusting quadrangular images in the at least two initial images respectively to at least two rectangular images; and the step of obtaining a final image based on the rectangular image and outputting the final image includes: combining the at least two rectangular images to obtain the final image; and outputting the final image.

In some specific implementations, the step of combining the at least two rectangular images to obtain the final image includes: performing feature point alignment on the at least two rectangular images; determining, based on distribution of definitions of each aligned rectangular image, a plurality of to-be-combined regions in the final image; and combining the to-be-combined regions based on the definitions of each rectangular image to obtain the final image.

In some specific implementations, the step of combining the to-be-combined regions to obtain the final image includes either of the following: obtaining, from each rectangular image, one region with a highest definition corresponding to the to-be-combined region, and stitching the obtained regions to obtain the final image; or obtaining, from each rectangular image, at least two regions corresponding to the to-be-combined region, and performing pixel fusion based on definition weights, to obtain the final image.

In some specific implementations, the terminal has at least two cameras, and the step of photographing at least one initial image based on the at least one focus includes: controlling each camera to photograph at least one initial image based on a different focus.

In some specific implementations, before the step of photographing at least one initial image based on the focus, the method further includes: determining a quantity of to-be-obtained initial images based on a quantity of times that a user successively enters a photographing instruction within a specific time period.

In some embodiments, during a photographing process in the method, the apparatus selects, in the detected quadrangular image, at least one focus corresponding to a near end of the rectangular target and at least one focus corresponding to the far end of the rectangular target, and performs photographing based on the focuses, to obtain a plurality of initial images; adjusts the several initial images to rectangular images, and selects, from the rectangular images, regions with higher definitions to form a combined image; and outputs the combined image as the final image. By selecting focuses in different locations for focusing, initial images with different partial definitions can be obtained, and partial definitions of the corrected rectangular images are also different. In this way, regions with highest definitions of the rectangular images are combined, so as to further increase a definition of the final image.

In some specific implementations, before the step of photographing at least one initial image based on the at least one focus, the method further includes: determining a quantity of to-be-photographed initial images.

In some specific implementations, the step of determining a quantity of to-be-photographed initial images includes: determining the quantity of to-be-photographed initial images based on the included angle between the opposite sides of the first pair of opposite sides in the quadrangular image detected in the preview image, or a distribution curve of definitions in a direction from the first side to the opposite side of the first side in the quadrangular image.

According to a second aspect, some embodiments of the present invention provide an image photographing apparatus in a terminal with a camera, where the apparatus includes: a detection module, configured to: enter a photographing mode, and detect a quadrangular image in a preview image; a photographing module, configured to: based on a photographing instruction, select at least one focus in the quadrangular image, and photograph at least one initial image based on the at least one focus, where the quadrangular image includes a first pair of opposite sides and a second pair of opposite sides, an included angle between the opposite sides of the first pair of opposite sides is less than that of the second pair of opposite sides, a first side is a shorter side of the first pair of opposite sides, the at least one focus includes a first focus, and the first focus is in the quadrangular image and in a partial region including the first side; a correction module, configured to adjust a quadrangular image in each of the at least one initial image to a rectangular image; and an output module, configured to obtain a final image based on the rectangular image and output the final image.

In some specific implementations, the photographing module includes: a first photographing submodule, configured to: select the first focus in the quadrangular image, and photograph an initial image based on the first focus.

In some specific implementations, the first photographing submodule includes: a first-side determining submodule, configured to determine a first point and a second point respectively on a second side and a third side of the quadrangular image, where the second side and the third side are adjacent to the first side, a distance between the first point and a vertex at which the first side and the second side intersect is less than or equal to a distance between the first point and a vertex at which the second side and a fourth side intersect, a distance between the second point and a vertex at which the first side and the third side intersect is less than or equal to a distance between the second point and a vertex at which the third side and the fourth side intersect, and the fourth side is an opposite side of the first side; a first-region determining submodule, configured to determine, as the partial region including the first side, a first region formed by connecting the vertex at which the first side and the second side intersect, the vertex at which the first side and the third side intersect, the second point, and the first point in order; and a first-focus determining submodule, configured to select a point in the first region as the first focus.

In some specific implementations, the first-focus determining submodule includes either of the following: a first selection unit, configured to select an intersection point of diagonals of the first region as the first focus; or a second selection unit, configured to select an intersection point of lines connecting midpoints of opposite sides of the first region as the first focus.

In some specific implementations, the first-focus determining submodule includes any one of the following: a third selection unit, configured to select, as the first focus, a point determined dynamically based on luminance distribution in the first region; a fourth selection unit, configured to select, as the first focus, a point determined dynamically based on a to-be-tracked target in the first region; or a fifth selection unit, configured to select, as the first focus, a center of gravity determined based on uneven density distribution in the first region.

In some specific implementations, the first-focus determining submodule includes either of the following: the output module includes: a first output submodule, configured to output the rectangular image as the final image.

In some specific implementations, the first-focus determining submodule includes either of the following: the photographing module includes: a second photographing submodule, configured to: select at least two focuses in the quadrangular image, where the at least two focuses include at least one first focus and at least one second focus, and the second focus is different from the first focus; and photograph at least two initial images based on the at least two focuses respectively.

In some specific implementations, the second-focus determining submodule includes either of the following: the second focus is a point selected in a partial region including an opposite side of the first side in the quadrangular image.

In some specific implementation, the second-focus determining submodule includes any one of the following: the second photographing submodule includes: a second-side determining submodule, configured to determine a third point and a fourth point respectively on a second side and a third side of the quadrangular image, where the second side and the third side are adjacent to the first side, a distance between the third point and a vertex at which the first side and the second side intersect is greater than or equal to a distance between the third point and a vertex at which the second side and a fourth side intersect, a distance between the fourth point and a vertex at which the first side and the third side intersect is greater than or equal to a distance between the fourth point and a vertex at which the third side and the fourth side intersect, and the fourth side is an opposite side of the first side; a second-region determining submodule, configured to determine, as the partial region including the opposite side of the first side, a second region formed by connecting the vertex at which the fourth side and the second side intersect, the vertex at which the fourth side and the third side intersect, the fourth point, and the third point in order; and a second-focus determining submodule, configured to select a point in the second region as the second focus.

In some specific implementations, the correction module includes: a correction submodule, configured to adjust quadrangular images in the at least two initial images respectively to at least two rectangular images; and the output module includes: a combination submodule, configured to combine the at least two rectangular images to obtain final image; and a second output submodule, configured to output the final image.

In some specific implementations, the combination submodule includes: an analysis submodule, configured to perform definition analysis and feature point alignment on the rectangular images; a region division submodule, configured to determine, based on distribution of definitions of each aligned rectangular image, several to-be-combined regions; and an execution submodule, configured to combine the to-be-combined regions based on the definitions of each rectangular image.

In some specific implementations, the execution submodule includes either of the following: a first combination subunit, configured to: obtain, from each rectangular image, one region with a highest definition corresponding to the to-be-combined region, and stitch the obtained regions to obtain the final image; or a second combination subunit, configured to: obtain, from each rectangular image, at least two regions corresponding to the to-be-combined region, and perform pixel fusion based on definition weights, to obtain the final image.

In some specific implementations, when the terminal has at least two cameras, the photographing module includes: a control submodule, configured to control each camera to photograph at least one initial image based on a different focus.

In some specific implementations, the apparatus further includes: a selection module, configured to determine a quantity of to-be-photographed initial images before the at least one initial image is photographed based on the at least one focus.

In some specific implementations, the selection module includes: a selection submodule, configured to determine the quantity of to-be-photographed initial images based on the included angle between the opposite sides of the first pair of opposite sides in the quadrangular image detected in the preview image, or a distribution curve of definitions in a direction from the first side to the opposite side of the first side in the quadrangular image.

According to a third aspect, some embodiments of the present invention provide a terminal, including: at least one camera; one display unit; one or more processors; a memory; and a plurality of application programs, where the memory is configured to store a computer program; and the processor runs the computer program to execute the following procedure: entering a photographing mode, and detecting a quadrangular image in a preview image; based on a photographing instruction, selecting at least one focus in the quadrangular image, and photographing at least one initial image based on the at least one focus, where the quadrangular image includes a first pair of opposite sides and a second pair of opposite sides, an included angle between the opposite sides of the first pair of opposite sides is less than that of the second pair of opposite sides, a first side is a shorter side of the first pair of opposite sides, the at least one focus includes a first focus, and the first focus is in the quadrangular image and in a partial region including the first side; adjusting a quadrangular image in each of the at least one initial image to a rectangular image; and obtaining a final image based on the rectangular image and outputting the final image.

In some specific implementations, the terminal can execute a procedure according to the method provided in the embodiments of the present invention in the first aspect.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some but not all embodiments of the present invention. Persons of ordinary skill in the art may still derive other drawings from these accompanying drawings without creative efforts.

FIG. 11 is a schematic diagram of a pixel interpolation method during rectangle correction according to some embodiments;

FIG. 13a to FIG. 13c are simplified schematic diagrams illustrating processes before and after performing feature point alignment on two quadrangular images according to some embodiments;

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings. All other embodiments obtained by persons of ordinary skill in the art without creative efforts shall fall within the protection scope of the present invention.

In some embodiments, the technical solutions in the embodiments of the present invention can be applied to a terminal capable of image photographing. The terminal may be any electronic device incorporating a photographing function and an image processing function. The electronic device may be a smart camera, a mobile phone, a tablet computer, a laptop computer, a digital camera, a projection device, a personal digital assistant (PDA for short), an e-book reader, a wearable device, or the like. This is not further limited in the embodiments of the present invention.

Figure 1:
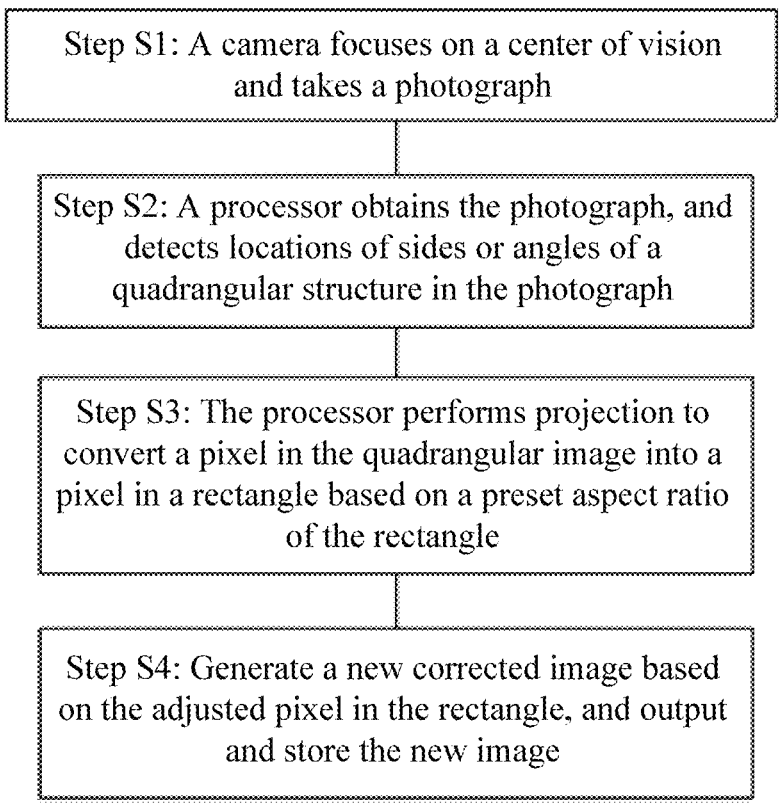
FIG. 1 is a schematic flowchart of an image obtaining method in the prior art.
Figure 2:
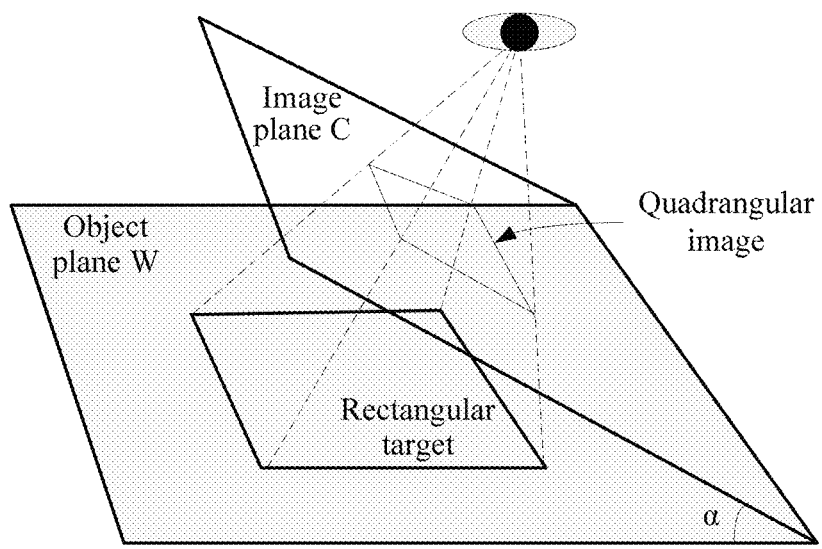
FIG. 2 is a schematic diagram of imaging abstraction of obliquely photographing a rectangular target.
Figure 3:
FIG. 3 is a schematic diagram of obliquely photographing a rectangular target during an image obtaining process according to an image obtaining method in the prior art.
Figure 4:
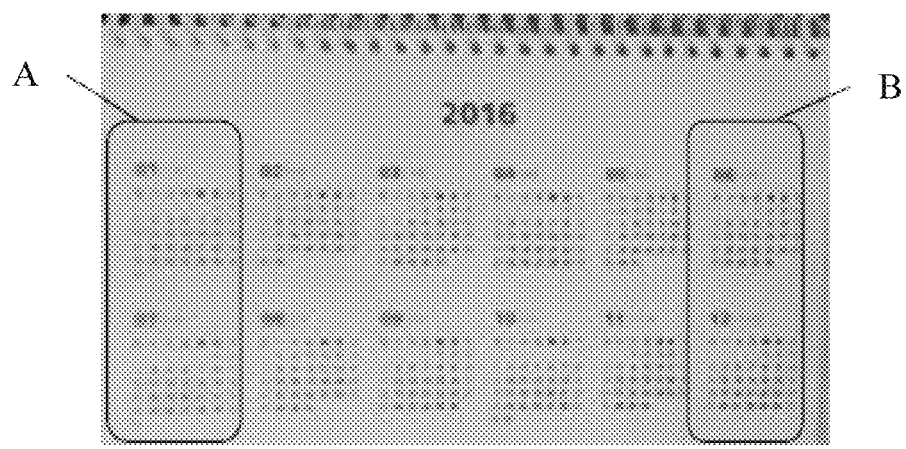
FIG. 4 is a schematic diagram of a target image obtained after rectangle correction is performed on an initial image obtained in FIG. 3.
Figure 5:
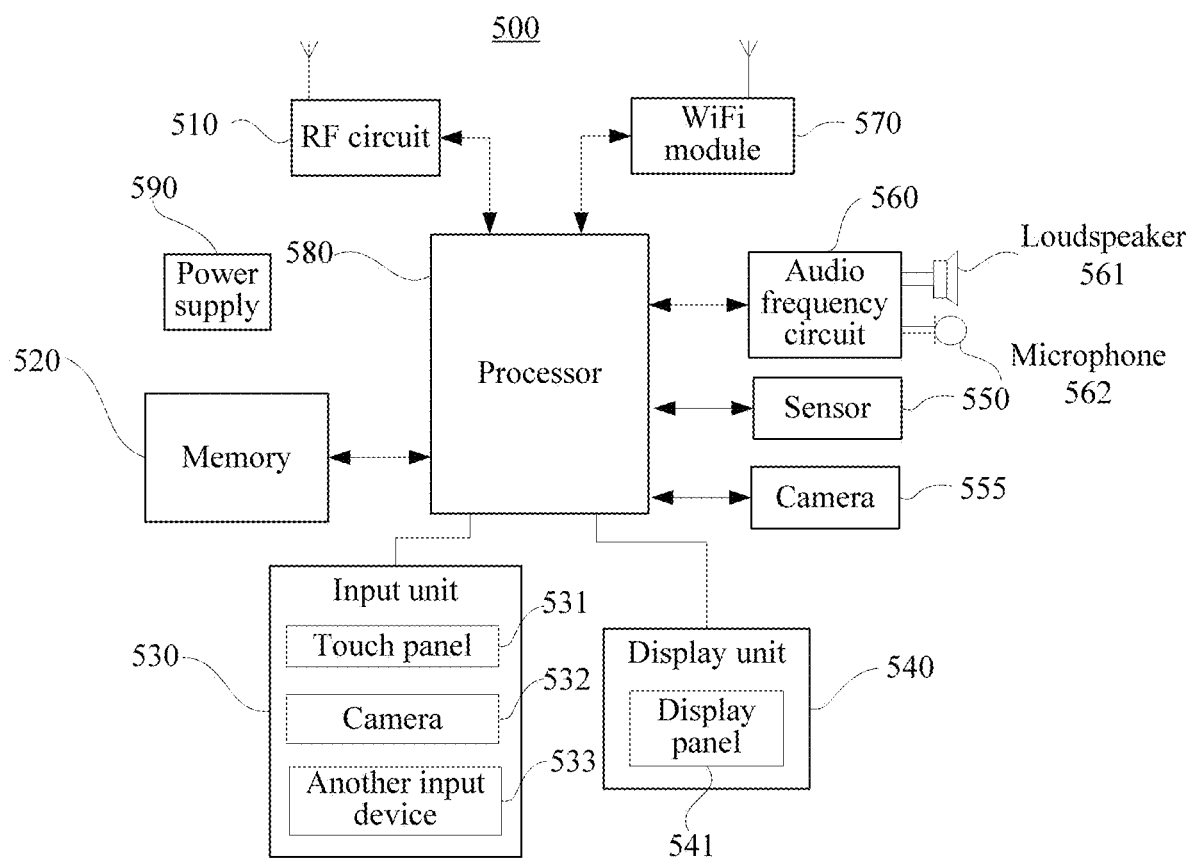
FIG. 5 is a schematic structural diagram of a terminal according to some embodiments.

FIG. 5 is a schematic structural diagram of a terminal according to some embodiments. The terminal can be configured to execute a method according to an embodiment.

The terminal may be a terminal device such as a mobile phone, a tablet computer, a PDA, a POS (Point of Sales), an in-vehicle computer, or a digital camera. Referring to FIG. 5, a terminal 500 includes components such as an RF (Radio Frequency) circuit 510, a memory 520, an input unit 530, a display unit 540, a sensor 550, an audio frequency circuit 560, a WiFi (Wireless Fidelity) module 570, a processor 580, and a power supply 590. Persons skilled in the art can understand that a structure of the terminal shown in FIG. 5 is merely used as an example and does not constitute a limitation on the terminal. The terminal may include more or fewer components than those shown in the figure, or a combination of some components, or the components disposed differently.

The following describes each constituent part of the terminal 500 in detail with reference to FIG. 5.

The RF circuit 510 may be configured to: receive and send in an information receiving and sending process or a call process; and in particular, after receiving downlink information of a base station, send the downlink information to the processor 580 for processing; in addition, send related uplink data to the base station. Generally, the RF circuit includes but is not limited to an antenna, at least one amplifier, a transceiver, a coupler, an LNA (Low Noise Amplifier), and a duplexer. In addition, the RF circuit 510 may also communicate with a network and another device through wireless communication. For the wireless communication, any communications standard or protocol may be used, including but not limited to a GSM (Global System of Mobile communication), a GPRS (General Packet Radio Service), CDMA (Code Division Multiple Access), WCDMA (Wideband Code Division Multiple Access), LTE (Long Term Evolution), an email, and SMS (Short Messaging Service). A communications terminal may include an RF circuit; a non-communications terminal, such as a digital camera, may include no RF circuit.

The memory 520 may be configured to store a software program and a module. The processor 580 performs various function applications of the terminal 500 and data processing by running the software program and the module that are stored in the memory 520. The memory 520 may mainly include a program storage area and a data storage area. The program storage area may store an operating system, an application program required for at least one function (such as a voice playback function and an image playback function), and the like; and the data storage area may store data (such as audio data and a phone book) created based on the use of the terminal 500, and the like. In addition, the memory 520 may include a high-speed random access memory, and may further include a non-volatile memory such as at least one magnetic disk storage device, a flash memory device, or another volatile solid-state storage device.

The input unit 530 may be configured to receive input digital or character information and generate key signal input related to user setting and function control of the terminal 500. Specifically, the input unit 530 may include a touch panel 531, at least one camera 532, and another input device 533. The touch panel 531 is also referred to as a touchscreen and may collect a touch operation (such as an operation performed by a user on the touch panel 531 or near the touch panel 531 by using any proper object or accessory, such as a finger or a stylus) performed by the user on or near the touch panel 531, and drive a corresponding connection apparatus based on a preset program. Optionally, the touch panel 531 may include two parts: a touch detection apparatus and a touch controller. The touch detection apparatus detects a touch direction of the user, detects a signal generated by a touch operation, and transmits the signal to the touch controller. The touch controller receives touch information from the touch detection apparatus, converts the touch information into contact coordinates, sends the contact coordinates to the processor 580, and can receive and execute a command sent by the processor 58o. In addition, the touch panel 531 may be implemented by using a plurality of types, such as a resistive type, a capacitive type, an infrared type, and a surface acoustic wave type. In addition to the touch panel 531, the input unit 530 may include at least one camera 532. The camera 532 may perform photographing based on the touch information received by the touch device, and transmit an obtained photographed image to the processor 580 for corresponding processing. The camera 532 may be a digital camera or an analog camera, and an imaging color of the camera 532 may be a multicolor, a monochrome color, a grey level, or the like. The camera 532 may be installed directly on the terminal, or may be externally connected to the terminal by using a data line. In addition to the touch panel 531 and the camera 532, the input unit 530 may further include the another input device 533. Specifically, the another input device 533 may include but is not limited to one or more of a physical keyboard, a function key (such as a volume control key or an on/off key), a trackball, a mouse, and a joystick.

The display unit 540 may be configured to display information entered by the user or information provided for the user, and various menus of the terminal 500. The display unit 540 may include a display panel 541. Optionally, the display panel 541 may be configured in a form of an LCD (Liquid Crystal Display), an OLED (Organic Light-Emitting Diode), and the like. Further, the touch panel 531 may cover the display panel 541. After detecting a touch operation on or near the touch panel 531, the touch panel 531 transmits information about the touch operation to the processor 580 to determine a touch event type, and then the processor 580 provides corresponding visual output on the display panel 541 based on the touch event type. In FIG. 5, the touch panel 531 and the display panel 541 are used as two independent components to implement input and output functions of the terminal 500. However, in some embodiments, the touch panel 531 and the display panel 541 may be integrated to implement the input and output functions of the terminal 500.

The terminal 500 may further include at least one sensor 550 such as a light sensor, a motion sensor, or another sensor. Specifically, the light sensor may include an ambient light sensor and a proximity sensor. The ambient light sensor may adjust luminance of the display panel 541 based on brightness of ambient light. The proximity sensor may turn off the display panel 541 and/or backlight when the terminal 500 moves close to an ear. As a type of motion sensor, an acceleration sensor may detect values of acceleration in directions (usually three axes), may detect, in a static state, a value and a direction of gravity, and may be used for an application that identifies a posture (such as screen switching between a landscape mode and a portrait mode, a related game, and magnetometer posture calibration) of the terminal, a vibration-identification-related function (such as a pedometer and tapping), and the like. Other sensors that can be configured on the terminal 500 such as a gyroscope, a barometer, a hygrometer, a thermometer, and an infrared sensor are not described herein.

The audio frequency circuit 560, a loudspeaker 561, and a microphone 562 may provide an audio interface between the user and the terminal 500. The audio frequency circuit 560 may transmit, to the loudspeaker 561, an electrical signal that is obtained after conversion of received audio data, and the loudspeaker 561 converts the electrical signal into a sound signal and outputs the sound signal. In addition, the microphone 562 converts a collected sound signal into an electrical signal; the audio frequency circuit 560 receives and converts the electrical signal into audio data, and outputs the audio data to the processor 580 for processing; and then processed audio data is sent to, for example, another terminal by using the RF circuit 510, or the audio data is output to the memory 520 for further processing.

WiFi is a short-distance wireless transmission technology. By using the WiFi module 570, the terminal 500 may help the user receive and send an email, browse a web page, access streaming media, and the like. The WiFi module 570 provides wireless broadband Internet access for the user. Although FIG. 5 shows the WiFi module 570, it can be understood that the WiFi module 570 is not a necessary constituent of the terminal 500, and may be totally omitted as required without changing the essence scope of the present invention.

The processor 580 is a control center of the terminal 500, is connected to all the parts of the entire terminal by using various interfaces and lines, and executes, by running or executing the software program and/or the module that are/is stored in the memory 520 and by invoking data stored in the memory 520, various functions of the terminal 500 and data processing, so as to perform overall monitoring on the terminal. Optionally, the processor 580 may include one or more processing units. Preferably, an application processor and a modem processor may be integrated into the processor 58o. The application processor mainly processes an operating system, a user interface, an application program, and the like, and the modem processor mainly processes wireless communication. It can be understood that the modem processor may alternatively not be integrated into the processor 580.

The terminal 500 further includes the power supply 590 (such as a battery) that supplies power to all the components. Preferably, the power supply may be logically connected to the processor 580 by using a power management system, so that functions such as charging and discharging management and power consumption management are implemented by using the power management system.

Although not shown, the terminal 500 may further include a Bluetooth module and the like. Details are not described herein.

In this embodiment of the present invention, the processor included in the terminal may have the following functions: entering a photographing mode, and detecting a quadrangular image in a preview image; photographing at least one initial image based on a photographing instruction, where the initial image includes at least one image photographed based on a first focus that is a point in a partial region near a shorter side in the quadrangular image; adjusting the quadrangular image in the initial image to a rectangular image; and when there are a plurality of initial images, based on distribution of definitions of each corrected rectangular image, combining the several rectangular images to obtain a clear final image.

The terminal may implement the foregoing functions by using the specific method in the foregoing embodiment described in this application. For ease of brevity, details are not described again and are inclusive through citation herein.

Figure 6:
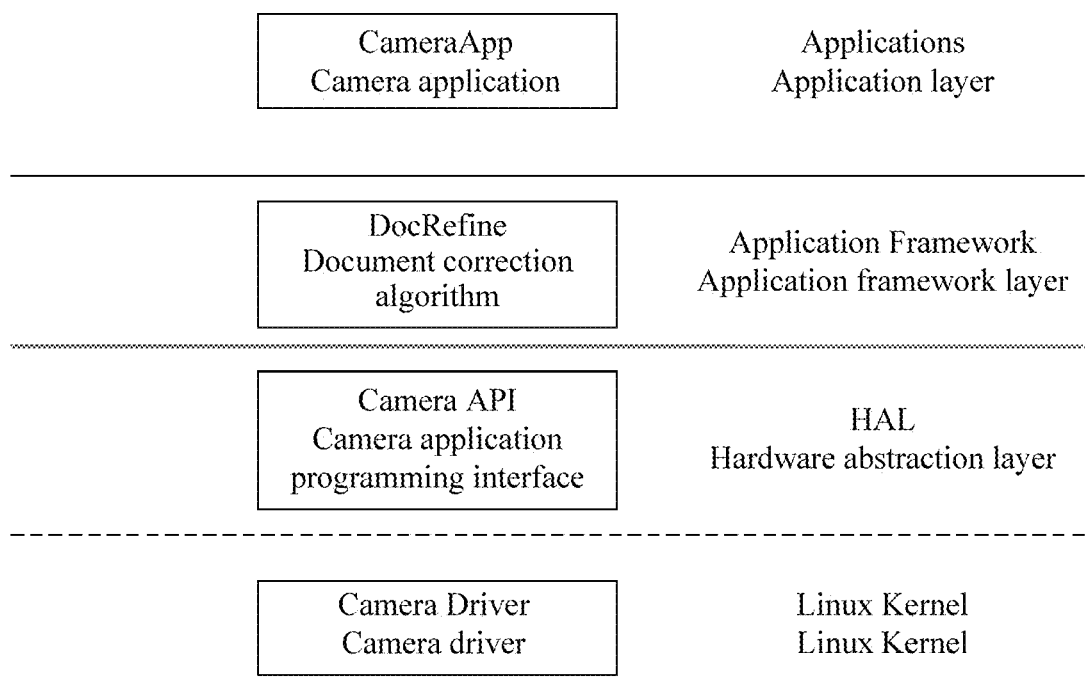
FIG. 6 is a schematic diagram of module functions in an Android framework according to some embodiments.

As shown in FIG. 6, in an Android system architecture, a document correction module is a function related to photographing, and an algorithm and a camera operation are implemented at a framework layer (a software framework layer).

The architecture is divided into an application layer, an application framework layer, a hardware abstraction layer, and a kernel. The application layer mainly provides a camera application, and controls a camera to obtain a preview image and photograph an initial image. The application framework layer detects a quadrangular image in the preview image; adjusts the initial image to a rectangular image based on a document correction algorithm; and when there are a plurality of rectangular images, performs feature alignment and combines the rectangular images to form a final image. A camera driver in the kernel is a program controlling specific actions of the camera, for example, controlling actions of the camera such as focusing and photographing. Cameras of different manufacturers and models have different drivers. The camera driver is a final execution module for preview, focusing, photographing, and photographing parameter adjustment at the application layer, and directly controls hardware of the camera. The hardware abstraction layer performs encapsulation on a kernel driver, provides an interface for an upper layer, and shields implementation details of a lower layer. The hardware abstraction layer is to perform hardware abstraction, hides hardware interface details of a specific platform, and provides a virtual hardware platform for an operating system, so that the operating system is unrelated to hardware and can be migrated between a plurality of platforms. The hardware abstraction layer is a programming layer, and allows the operating system to interact with a hardware device at a logical layer rather than a hardware layer. An operating system kernel or a hardware driver can call the hardware abstraction layer. In any case, hardware design details do not need to be learnt for program invocation, and only a parameter required by the abstraction layer needs to be provided. The hardware abstraction layer is a bridge connecting the application framework layer and the camera driver, and serves as an agent to forward a camera control instruction of the application layer and the application framework layer to the correct hardware driver for action execution, and returns data obtained from the hardware to the application layer and the application framework layer.

Figure 7:
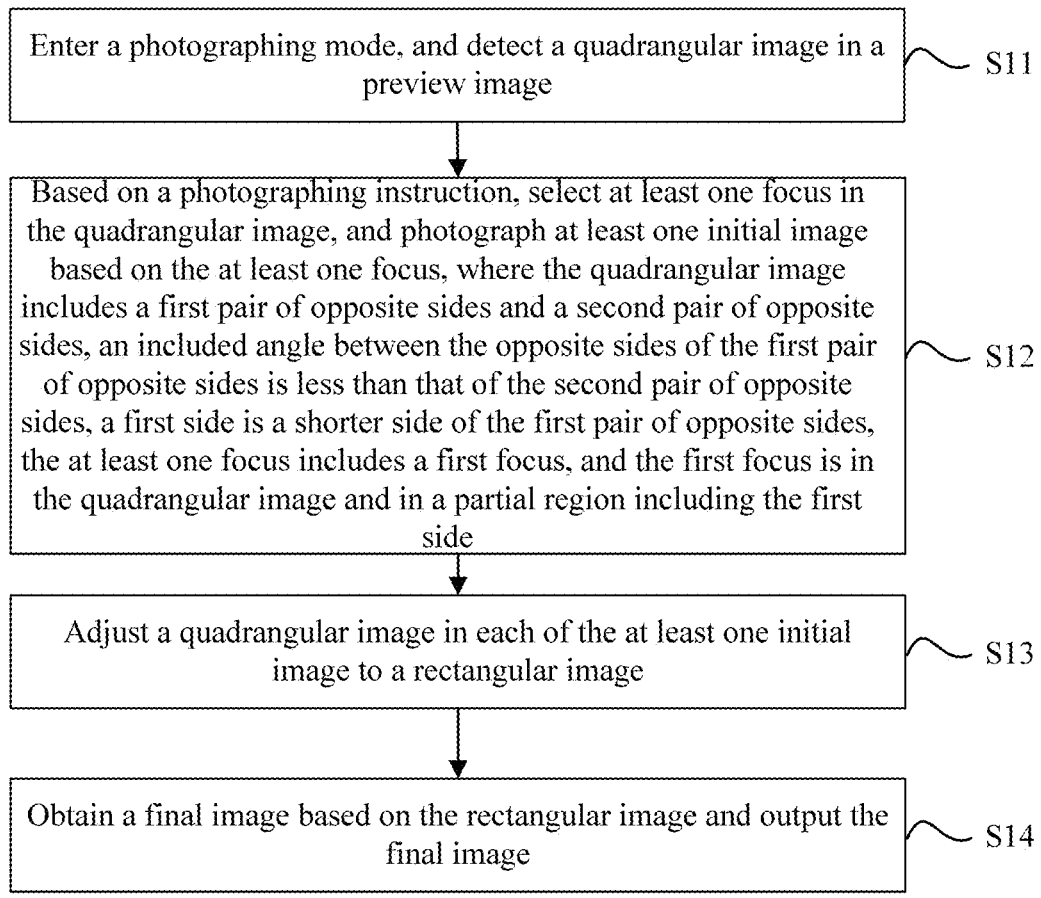
FIG. 7 is a schematic flowchart of an image photographing method according to some embodiments.

FIG. 7 is an image photographing method according to some embodiments. The method may be applied to a document correction (or referred to as keystone correction) photographing mode, and is used to increase a definition of a corrected image after document correction. An image is input for document correction, and an image is output after document correction. In document correction, a quadrangular image is detected, transformed, and processed, so as to help correct distortion in an image caused by an oblique photographing angle when a user photographs a rectangular target, and finally output a rectangular image. Herein, the rectangular target is generally a rectangular image containing information, for example, a file, an invoice, a book, a business card, a certificate, a handout, a photograph, an advertisement, a display panel, a television, a film, or a screen. Certainly, persons skilled in the art should understand that the foregoing rectangular target is merely an example, and the method provided in this application can be used to photograph any other rectangular objects and perform image correction.

With reference to FIG. 7, the method according to some embodiments includes step S11, step S12, step S13, and step S14. With reference to FIG. 7, step S11 includes: Enter a photographing mode, and detect a quadrangular image in a preview image. Step S12 includes: Based on a photographing instruction, select at least one focus in the quadrangular image, and photograph at least one initial image based on the at least one focus, where the quadrangular image includes a first pair of opposite sides and a second pair of opposite sides, an included angle between the opposite sides of the first pair of opposite sides is less than that of the second pair of opposite sides, a first side is a shorter side of the first pair of opposite sides, the at least one focus includes a first focus, and the first focus is in the quadrangular image and in a partial region including the first side. Step S13 includes: Adjust a quadrangular image in each of the at least one initial image to a rectangular image. Step S14 includes: Obtain a final image based on the rectangular image and output the final image.

In some embodiments, if the terminal chooses to photograph one initial image, the following steps are performed. In step S12, based on the photographing instruction, the terminal selects, as the first focus, a point in the partial region including the first side in the quadrangular image, and photographs one initial image based on the first focus, where the first side is a shorter side of two opposite sides with a smaller included angle between opposite sides in two included angles between opposite sides of the quadrangular image. In step S13, the terminal adjusts a quadrangular image in the initial image as a rectangular image. In step S14, the terminal outputs the rectangular image as a final image. Outputting the final image may include: directly displaying the final image on a display unit; or saving the final image into storage space of photographed images, and displaying the final image on a display unit based on a user instruction.

According to some embodiments, in the method, the point in the region including the first side corresponding to a far end of the photographed rectangular target is selected as the first focus for photographing the initial image, so that a resolution of the partial region in the initial image corresponding to the far end of the rectangular target can be increased. This increases a source pixel for correction interpolation of the partial region during a correction process, and can increase a definition of the final image.

Specifically, in step S11, the terminal starts a photographing device (for example, a camera) based on a corresponding user operation, to enter the photographing mode.

In some embodiments, the corresponding user operation may include any recognizable operation performed by a user on a device, and may include any one of the following: any designated touch operation (tapping, sliding, or the like) performed on a touch device of the device, a sound control operation recognizable by the device, a gesture operation, or the like.

In some embodiments, the photographing mode may be a document correction photographing mode selected by the user.

Then, in the photographing mode, the terminal obtains a preview image by using the camera, and detects a quadrangular image in the preview image. In some embodiments, when the terminal obtains the preview image, a focus used may be a point in a central region of the preview image (for example, a central point), and focusing is performed persistently as a framing location changes. In some embodiments, a focus used may alternatively be a point (for example, a central point of a human eye) dynamically determined based on a to-be-tracked target.

In some embodiments, the terminal obtains, in real time, an image captured by the camera, and displays the obtained image as a preview image. The preview image may be displayed on a display device (for example, a display screen) of the terminal. When the camera targets at a rectangular target, an image of the rectangular target is displayed in the preview image. Usually, a plane on which the camera is located is not parallel to a plane on which the rectangular target is located, and is oblique relative to the plane on which the photographed rectangular target is located. A quadrangular image of the rectangular target is displayed in the preview image. Generally, a larger oblique photographing angle indicates a larger deformation of a displayed quadrangular image of the rectangular target.

In some embodiments, when detecting a quadrangular image in a preview image, the terminal may detect locations of sides and angles of the quadrangular image by using some detection methods. A method for detecting locations of sides and angles is, for example, identifying actual edges of the quadrangular image by using a Canny operator edge detection method. The Canny operator edge detection method is based on a computational theory of edge detection, Hough transform detection technology (a parameter estimation technology by using a voting principle) straight-line detection, Harris corner detection (Harris Conner Points), and the like. Persons skilled in the art should understand that other methods for detecting locations of sides and angles of a quadrangular structure that are applicable to this embodiment of the present invention can still be included in this embodiment of the present invention through citation, and details about the other methods are not described.

Next, step S12 includes step S121. Step S121 includes: Based on the photographing instruction, select, as the first focus, the point in the partial region including the first side in the quadrangular image, and photograph the initial image based on the first focus, where the first side is a shorter side of two opposite sides with a smaller included angle between opposite sides in the quadrangular image.

Herein, the photographing instruction may be automatically triggered by the terminal after the photographing mode is entered. For example, in a document correction mode, photographing an initial image is automatically triggered when a quadrangular image is detected in a preview image. Alternatively, the photographing instruction may be determined through inputting based on the user operation. The initial image is an image that is captured by the camera based on the photographing instruction and on which rectangle correction and/or combination are/is not performed.

Based on a principle of oblique photographing, two opposite sides with a smaller included angle between opposite sides are two sides with a larger photographing distance difference. Based on a principle that "An object looks small in the distance and big on the contrary", in two opposite sides with a smaller included angle between opposite sides, a shorter side, that is, the first side, is corresponding to a farthest end of the rectangular target, and a longer side, that is, an opposite side of the first side (a fourth side), is corresponding to a nearest end of the rectangular target.

In some embodiments, a method for determining the first side specifically includes: determining four sides of the quadrangular image, and determining two included angles between opposite sides, where in the two opposite sides with a smaller included angle between opposite sides, the shorter side is the first side corresponding to the farther end of the rectangular target, and the longer side is the opposite side of the first side corresponding to the nearest end of the rectangular target. An included angle between opposite sides is an included angle between extended lines of two opposite sides, or an included angle that is formed by moving one side in a parallel manner to make the side intersect with an opposite side.

Figure 8:
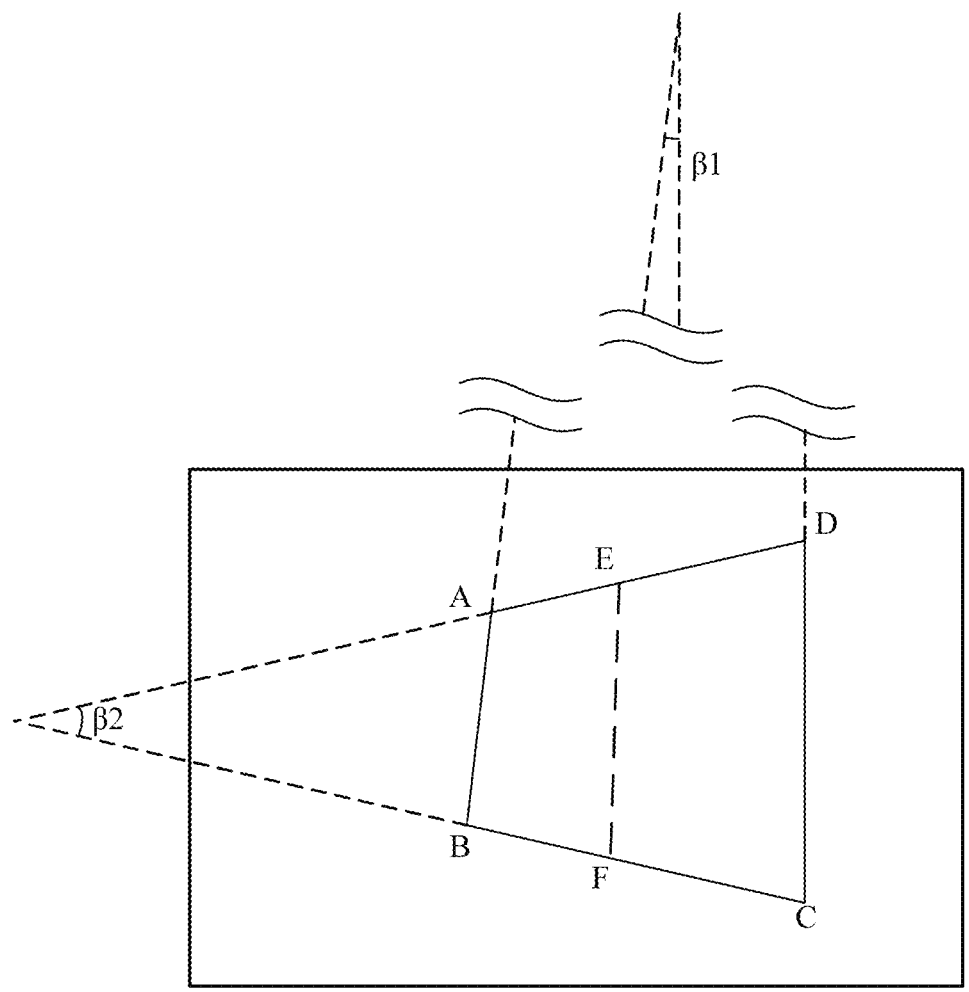
FIG. 8 is a schematic diagram of a quadrangular image in a preview image according to some embodiments.

With reference to FIG. 8, in a specific embodiment, a quadrangular image ABCD is detected in a preview image.

An included angle between opposite sides is an included angle formed between opposite sides. For example, an included angle between a side AB and a side CD is β1, and an included angle between a side AD and a side BC is β2, where β1 is less than β2, and the side AB is shorter than the side CD. In this case, it is determined that the shorter side AB is a first side, and the side CD is an opposite side of the first side. In some embodiments, when two opposite sides of the quadrangular image are parallel to each other, it is considered that an included angle between the opposite sides is 0°. A partial region including the first side AB in the quadrangular image ABCD is corresponding to a partial region at a far end of a rectangular target, and a point in the partial region including the first side AB in the quadrangular image ABCD is selected as the first focus. That is, the first focus is set in a region corresponding to the far end of the rectangular target.

In some embodiments, the specific step of determining the partial region including the first side may include step S121a and step S121b. Step S121a: Determine a first point and a second point respectively on a second side and a third side of the quadrangular image, a distance between the first point and a vertex at which the first side and the second side intersect is less than or equal to a distance between the first point and a vertex at which the second side and a fourth side intersect, a distance between the second point and a vertex at which the first side and the third side intersect is less than or equal to a distance between the second point and a vertex at which the third side and the fourth side intersect, and the fourth side is an opposite side of the first side. Step S121b: Determine, as the partial region including the first side, a first region formed by connecting the vertex at which the first side and the second side intersect, the vertex at which the first side and the third side intersect, the second point, and the first point in order.

With reference to FIG. 8, in some embodiments, the partial region including the first side AB in the quadrangular image ABCD may be a partial region ABFE that is cut off from the quadrangular image ABCD along a line connecting a point E and a point F, where the point E is on the second side AD of the quadrangular image ABCD (the point E is closer to the first side AB than to the fourth side CD), and the point F is on the third side BC and is closer to the first AB of the quadrangular image ABCD (the point F is closer to the first side AB than to the fourth side CD).

Then, in step S121c, the first focus is selected in the first region. In some preferred embodiments, manners of selecting the first focus are as follows: selecting an intersection point of diagonals of the first region as the first focus; selecting an intersection point of lines connecting midpoints of opposite sides of the first region as the first focus; selecting, as the first focus, a point dynamically determined based on luminance distribution in the first region; selecting, as the first focus, a point determined dynamically based on a to-be-tracked target in the first region; selecting, as the first focus, a center of gravity determined based on uneven density distribution in the first region, and the like.

Figure 10A:
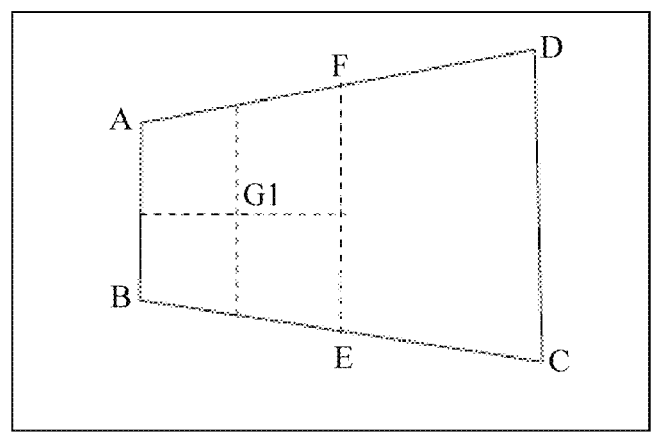
FIG. 10a to FIG. 10e are schematic diagrams of focus selection methods during a photographing process according to some embodiments.
Figure 10B:
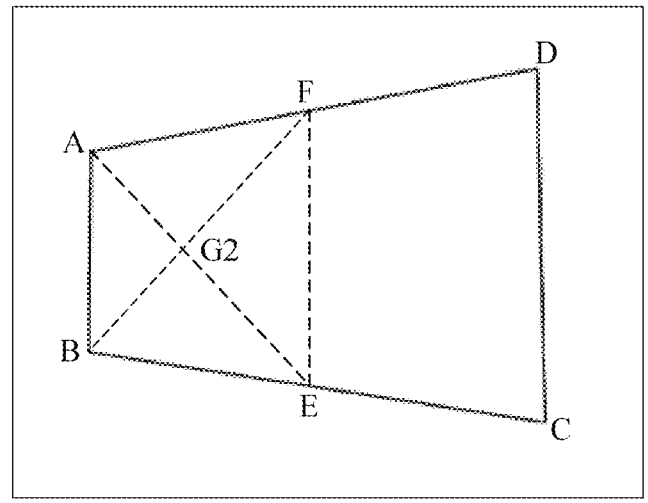

In some embodiments, referring to FIG. 10a, a midpoint F of a second side AD and a midpoint E of a third side BC are determined, so as to determine a first region ABEF. Next, a point is selected in the first region ABEF as the first focus. With reference to FIG. 10a and FIG. 10b, in some embodiments, an intersection point G1 of lines connecting midpoints of opposite sides is selected in the first region ABEF as the first focus, an intersection point G2 of two diagonals is selected in the first region ABFE as the first focus, or the like. In some embodiments, a point may alternatively be determined dynamically in a first region ABEF based on luminance distribution, a to-be-tracked target, or the like, as the first focus. The to-be-tracked target may be, for example, a target (for example, a human face) highlighted in a quadrangular image. In another embodiment, points of trisection F' and E' may be further determined, where the point F' is on the second side AD and is close to the first side AB, and the point E' is on the third side BC and is close to the first side AB; a first region ABE'F' is determined, and the like.

Figure 10C:
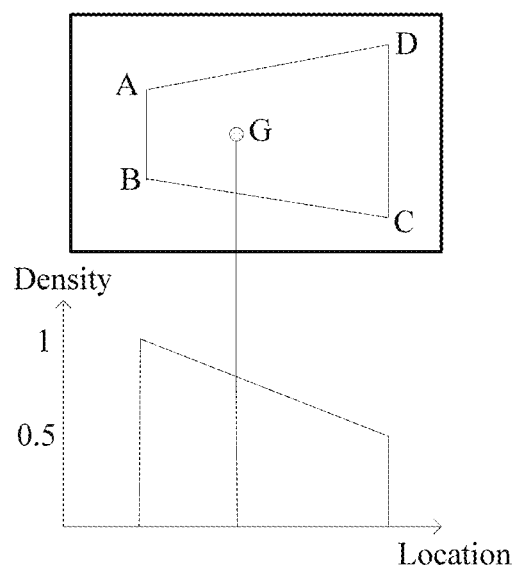

In some embodiments, as shown in FIG. 10c, a manner of selecting a first focus may alternatively be computing a center of gravity in a quadrangular image ABCD based on uneven density distribution. Specific steps include: (1) Detect the quadrangular image ABCD in the preview image. (2) Allocate different densities to different parts of the quadrangular image ABCD based on an oblique photographing angle of the quadrangular image. For example, in a horizontal direction of the preview image from a first side AB to a fourth side CD, a density proportion is set to be inversely proportional to a length of a side of a tangent plane (or a higher-power proportion); and in a vertical direction of the preview image from a second side AD to a third side BC, a density proportion is similarly set to be inversely proportional to a length of a side of a tangent plane (or a higher-power proportion). In FIG. 10c, an included angle between the first side AB and the fourth side CD is 0°, and density proportions in the vertical direction of the preview image from the second side AD to the third side BC are the same. (3) Compute the center of gravity of the quadrangular image ABCD based on the density proportion and an area of the quadrangular image ABCD, and use the center of gravity as the first focus G. Herein, according to a principle of a center of gravity, a center of gravity computed based on uneven density distribution is also a point in a region close to the first side.

According to some embodiments, in step S12, the terminal selects, in the quadrangular image, a point in a partial region close to a far end of the rectangular target, and increases, as much as possible, a definition of the partial region corresponding to the far end of the rectangular target in the quadrangular image, so as to compensate for a low resolution of the partial region corresponding to the far end of the rectangular target in the quadrangular image, and increase a definition of the initial image in a proper location of a depth of field, thereby increasing an overall definition of the final image and improving a visual effect of the final image.

Next, in step S13, the terminal adjusts the quadrangular image in the initial image to the rectangular image.

In some embodiments, a correction method may be: generating, based on pixel distribution of the quadrangular image, a matrix M for pixel location coordinates (x, y); determining, based on a size correspondence and a shape correspondence between the quadrangular image and the to-be-obtained rectangular image, a transformation matrix for adjusting the quadrangular image to the rectangular image; and computing a corresponding location (x', y') of a pixel in the new image by using the matrix M and the transformation matrix. If the pixel is located at integer coordinates, a pixel value of the pixel is used as a pixel value of the integer coordinates. If the pixel is not located at integer coordinates, several pixels adjacent to the integer coordinates are used for interpolation computation to obtain a pixel value of the integer coordinates and generate a new pixel. A matrix T is generated based on location coordinates of the new pixel, and the corrected rectangular image is generated based on the matrix T.

Figure 11:
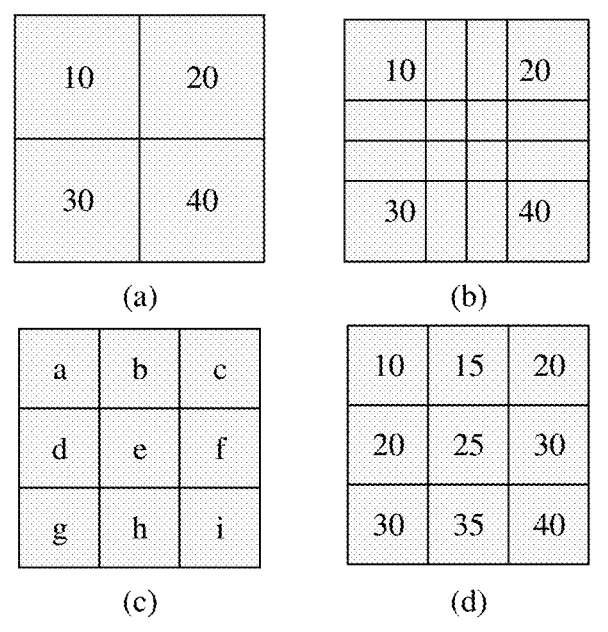

An interpolation method may be linear interpolation in which a linear function is used as an interpolation function. Bilinear interpolation is usually used for a two-dimensional image. Bilinear interpolation is linear interpolation extension for an interpolation function with two variables, and is implemented by performing one linear interpolation separately on two directions. With reference to FIG. 11, for example, interpolation is performed on four pixels to obtain nine pixels. Values of the four pixels are {10, 20, 30, 40} shown in (a). If the original pixels are increased to the nine pixels shown in (b), the nine pixels may be decreased to cover the four pixels, and pixels are combined by taking different weights based on an original pixel area covered by each new pixel. As shown in (c), a, c, g, and i each cover only one pixel, and a pixel value is equal to a pixel value of a pixel covered by them. b, d, f, and h each cover two pixels whose areas are the same and weights are also the same, and the two pixel values are fused based on weights. e covers four pixels whose areas are the same and weights are also the same, and the four pixels are fused based on a weighted average. Finally, the nine pixels shown in (d) are {10, 15, 20, 20, 25, 30, 30, 35, 40}.

In addition, other image interpolation methods such as nearest-neighbor interpolation, linear interpolation, bilinear interpolation, cubic convolution interpolation, and bicubic interpolation that are applicable to some embodiments of the present invention can still be applied to some embodiments of the present invention through citation, and details about the other methods are not described.

In some embodiments, in step S13, after the quadrangular image in the initial image is adjusted to the rectangular image, a regional image outside the quadrangular image in the initial image may be deleted.

In some embodiments, in step S13, after the quadrangular image in the initial image is adjusted to the rectangular image, a regional image outside the quadrangular image in the initial image may be retained and adjusted correspondingly based on a change of the quadrangular image. In some embodiments, a regional image outside the quadrangular image in the initial image may continue to be adjusted correspondingly in a subsequent step based on processes of alignment and combination performed on the rectangular image, and an adjusted regional image is retained in the final image for output.

In some embodiments, a regional image outside the quadrangular image in the initial image may be deleted in a subsequent step or may be deleted before the quadrangular image is adjusted to the rectangular image.

Figure 12:
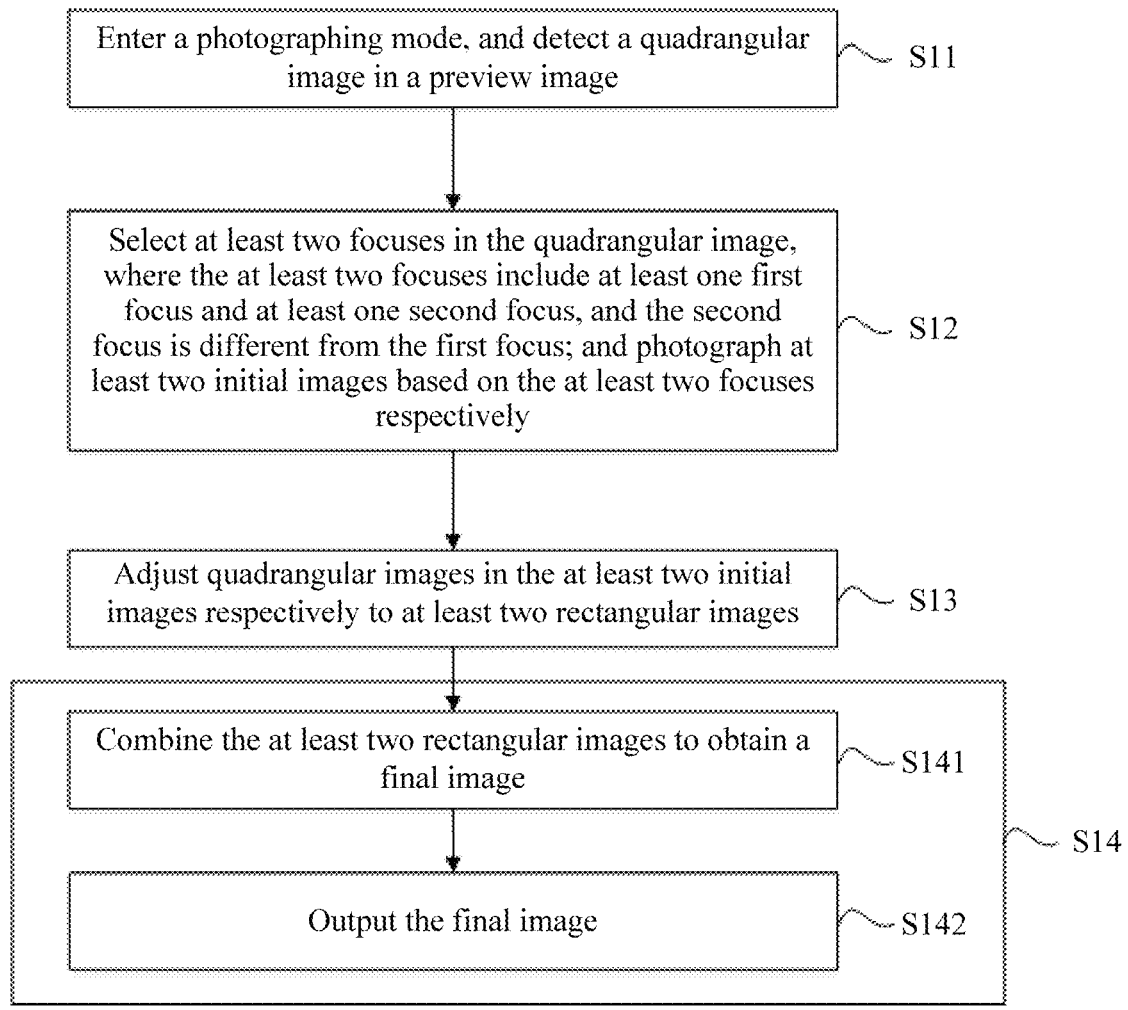
FIG. 12 is a schematic flowchart of an image photographing method according to some embodiments.

In some embodiments, the terminal chooses to photograph a plurality of initial images, performs rectangle correction and combination on the initial images, and outputs processed images. Specifically, with reference to FIG. 12, step S1i includes: Enter a photographing mode, and detect a quadrangular image in a preview image. Step S12 includes: Based on a photographing instruction, the terminal selects at least two focuses in the quadrangular image, where the at least two focuses include at least one first focus and at least one second focus; and photographs at least two initial images based on the focuses respectively, where the focuses include at least one point that is selected in a partial region including the first side in the quadrangular image and at least one point that is selected in a partial region including an opposite side of the first side in the quadrangular image, and the first side is a shorter side of two opposite sides with a smaller included angle in the quadrangular image. Step S13 includes: The terminal adjusts quadrangular images in the at least two initial images to rectangular images. Step S14 includes step S141 and step S142. Step S141 includes: The terminal combines the plurality of rectangular images to obtain a final image. Step S142 includes: Output the final image. Outputting the final image may include: directly displaying the final image on a display unit; or saving the final image into storage space of photographed images, and displaying the final image on a display unit based on a user instruction.

In some embodiments, during a photographing process in the method, the terminal selects, in the detected quadrangular image, at least one second focus and at least one first focus that is corresponding to the far end of the rectangular target, and performs photographing based on the focuses, to obtain a plurality of initial images; adjusts the several initial images to rectangular images, and selects, from the rectangular images, regions with higher definitions to form a combined image; and outputs the combined image as the final image. The second focus is different from the first focus. By selecting focuses in different locations for focusing, initial images with different partial definitions can be obtained, and partial definitions of the corrected rectangular images are also different. In this way, regions with highest definitions of the rectangular images are combined, so as to further increase a definition of the final image. Optionally, the second focus is a focus corresponding to a near end of the rectangular target.

Herein, content of this step S1i is the same or basically the same as content of step S11 shown in FIG. 7. For ease of brevity, details are not described again and are inclusive through citation herein.

Next, according to some embodiments, in this step S12, based on step S12 shown in FIG. 7, the terminal photographs a plurality of initial images based on the photographing instruction. The plurality of initial images include not only at least one image photographed based on the first focus that is a point selected in the partial region including the first side in the quadrangular image, but also include at least one image photographed based on the second focus that is a point selected in the partial region including the opposite side of the first side in the quadrangular image.

A quantity of to-be-photographed initial images is not limited, for example, one, two, three, four, or eight initial images may be photographed.

In some embodiments, a quantity of to-be-photographed initial images may be preset by a program or determined based on an operation selected by a user. For example, the program automatically sets that two initial images are photographed each time a user enters a photographing instruction (for example, tapping a photographing button). For another example, a prompt for selection is provided for a user each time a document correction photographing mode is entered, so that the user selects a quantity of to-be-photographed initial images, and then the corresponding quantity of initial images are photographed each time the user enters a photographing instruction (for example, tapping a photographing button).

In some embodiments, a quantity of to-be-photographed initial images is determined based on a user photographing instruction (an instruction for photographing a single image or photographing images continuously).

In some embodiments, the method further includes: determining the quantity of to-be-photographed initial images before photographing the initial images. The quantity of to-be-photographed initial images may be determined based on an imaging status of the quadrangular image in the preview image. The imaging status of the quadrangular image in the preview image may include but is not limited to: a deformation degree of the quadrangular image in the preview image or a difference between definitions of the quadrangular image in the preview image. If a deformation degree of the quadrangular image is relatively small or a difference between definitions of the corrected quadrangular image is relatively small, it is determined that a relatively small quantity of initial images are photographed; if a deformation degree of the quadrangular image is relatively large or a difference between definitions of the quadrangular image is relatively large, it is determined that a relatively large quantity of initial images are photographed, for example, two, four, or even more images are photographed.

In some embodiments, a distribution curve of definitions in a direction from the first side to the opposite side of the first side in the quadrangular image in the preview image is analyzed, and then the quantity of to-be-photographed initial images is determined based on the definition distribution curve. Generally, a larger change range of the definition distribution curve indicates a larger oblique photographing angle and a larger difference between definitions of the far end and the near end of the photographed rectangular target. More clear partial regions can be obtained by increasing a quantity of to-be-photographed initial images and by performing photographing based on different focus locations, so that an overall definition of the final image is increased at a subsequent combination stage.

In some embodiments, with reference to FIG. 8, determining a quantity of to-be-photographed initial images based on a deformation status of the quadrangular image may be determining the quantity of to-be-photographed initial images based on an included angle between the opposite sides of the quadrangular image, and specifically includes: (1) First detect a quadrangular image ABCD in a preview image. (2) Determine an included angle between the opposite sides of the quadrangular image ABCD. (3) For example, if any included angle β is greater than a preset included angle threshold, where the preset included angle threshold may be a value ranging from 10° to 20°, for example, 15°, it may be assumed that an oblique photographing angle is relatively large, and therefore it may be determined that two or even more initial images are to be photographed. If an included angle between two opposite sides is larger, a quantity of to-be-photographed initial images may be increased. Optionally, it may be determined whether a relatively small included angle between opposite sides is greater than the preset included angle threshold.

Figure 9:
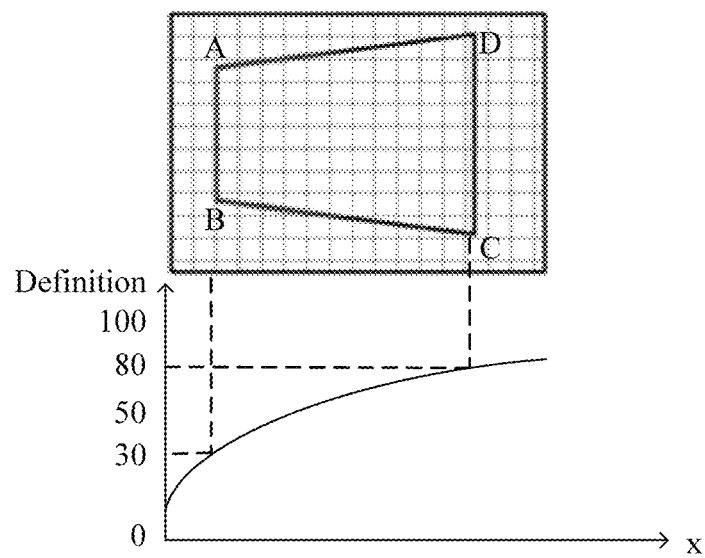
FIG. 9 is a schematic diagram of definitions of a quadrangular image that are detected in a preview image according to some embodiments.

In some embodiments, a distribution curve of definitions in a direction from the first side to the opposite side of the first side in the quadrangular image in the preview image is analyzed, and then the quantity of to-be-photographed initial images is determined based on the definition distribution curve. Generally, a larger change range of the definition distribution curve indicates a larger oblique photographing angle and a larger difference between definitions of the far end and the near end of the photographed rectangular target. More clear partial regions can be obtained by increasing a quantity of to-be-photographed initial images and by performing photographing based on different focus locations, so that an overall definition of the final image is increased at a subsequent combination stage. With reference to FIG. 9, a process of determining a quantity of to-be-photographed images based on definition distribution includes: (1) Detect a quadrangular image ABCD in a preview image. (2) Determine a curve of definitions in a first direction X (that is, a direction from a first side AB to a fourth side CD) in the quadrangular image ABCD in the preview image. (3) Determine a quantity of to-be-photographed initial images based on a definition curve change range within the quadrangular image. The change range is a difference between a maximum definition and a minimum definition. For example, a total score is 100. It is determined to photograph two initial images when the change range is 30 to 40, it is determined to photograph three initial images when the change range is 40 to 50, and it is determined to photograph four initial images when the change range is 50 to 80. In a specific scenario of an embodiment, a threshold related to an oblique photographing angle may be specifically set based on a different photographing scenario, a different photographing condition, and a different photographing requirement.

In addition, the imaging status of the quadrangular image in the preview image may be used to determine a quantity of to-be-photographed initial images, and may be further used as a reference for selecting a location of each focus during a process of photographing an initial image, or the like.

After a quantity of to-be-photographed initial images is determined, a quantity of focuses corresponding to the quantity of to-be-obtained initial images is selected. For a method for selecting a point, as the first focus, in the partial region including the first side in the quadrangular image, reference may be made to the selection method in step S12 shown in FIG. 7. Details are not described herein again.

In some embodiments, the method for selecting a point, as the second focus, in the partial region including the opposite side (that is, the fourth side) of the first side in the quadrangular image may include: determining a third point and a fourth point respectively on the second side and the third side, where a distance between the third point and a vertex at which the first side and the second side intersect is greater than or equal to a distance between the third point and a vertex at which the second side and the fourth side intersect, and a distance between the fourth point and a vertex at which the first side and the third side intersect is greater than or equal to a distance between the fourth point and a vertex at which the third side and the fourth side intersect; determining, as the partial region including the opposite side of the first side, a second region formed by connecting the vertex at which the fourth side and the second side intersect, the vertex at which the fourth side and the third side intersect, the fourth point, and the third point in order; and selecting at least one point in the second region as a second focus.

In some embodiments, the third point may overlap with the first point, and the fourth point may overlap with the first point.

In some embodiments, if three or more initial images need to be photographed, in addition to focuses that are points determined in the first region and the second region, another selected focus may be unnecessarily located in the first region or the second region. Preferably, a focus at a different location is selected each time, so as to obtain clear images for different partial regions.

In some embodiments, for a manner of selecting the second focus in the second region, reference may be made to the manner of selecting the first focus in the first region.

Figure 10D:
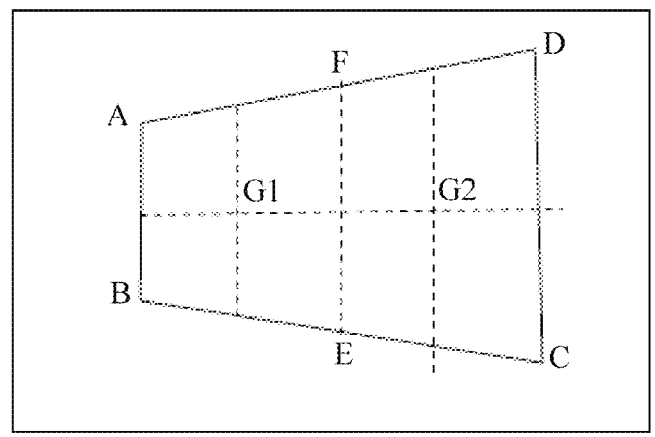

Specifically, for example, referring to FIG. 10d, when two initial images are photographed, in the quadrangular image ABCD, a midpoint of the second side AD that intersects with the fourth side CD is a point F, and a midpoint of the third side BC that intersects with the fourth side CD is a point E. In this case, a partial quadrangular region ABEF close to the first side AB and a partial quadrangular region CDFE close to the fourth side CD are selected.

Figure 10E:
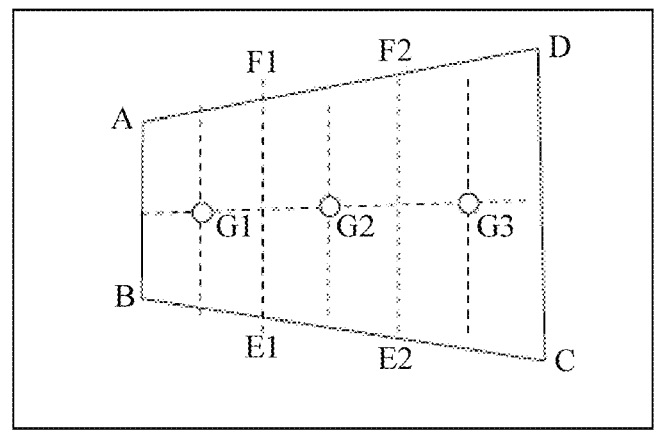

In another embodiment, referring to FIG. 10e, two points of trisection F1 and F2 on the second side AD and two points of trisection E1 and E2 on the third side BC divide the quadrangular region into three partial regions ABE1F1, F1E1E2F2, and F2E2CD. Intersection points of lines connecting midpoints of opposite sides of the three partial regions are determined as three focuses G1, G2, and G3 respectively.

In addition, a quantity of to-be-obtained initial images may alternatively be determined based on a photographing instruction that is successively entered (for example, a mode in which continuous photographing is performed by touching and holding a photographing button) by a user within a specific time period. A quantity of to-be-photographed initial images is variable. Therefore, if a quantity of initial images is unknown, a point in a partial region close to a shorter side in the quadrangular image is selected as the first focus when a first image is photographed; a point in a partial region close to a longer side in the quadrangular image is selected as the second focus when a second image is photographed. By analogy, a point in the partial region close to the shorter side in the quadrangular image and a point in the partial region close to the longer side in the quadrangular image are alternatively selected as focuses for taking photographs subsequently. However, a focus selected each time is different from any photographing focus selected previously.

For a plurality of initial images photographed based on a plurality of different focuses, an image region near a focus is relatively clear. More different focuses selected indicate that more clear partial regions of the quadrangular image can be obtained. This can help increase a definition of the final image.

In step S13, a quadrangular image in each initial image is adjusted to a rectangular image. For specific content of performing correction on each initial image in this step S13, reference may be made to specific content of step S13 shown in FIG. 7.

Next, in some embodiments, step S141 includes the following steps: Step S141a: Perform feature point alignment on the rectangular images. Step S141b: Determine, based on distribution of definitions of each aligned rectangular image, several to-be-combined regions. Step S141c: Combine the to-be-combined regions based on the definitions of each rectangular image.

The step of combining the to-be-combined regions based on the definitions of each rectangular image includes: obtaining, from each rectangular image, one region with a highest definition corresponding to the to-be-combined region, and stitching the obtained regions to obtain the final image; or obtaining, from each rectangular image, at least two regions corresponding to the to-be-combined region, and performing pixel fusion based on definition weights, to obtain the final image.

In some embodiments, when a plurality of initial images is photographed, rectangular target edges (including a side and an angle) detected after edge detection is performed on a quadrangular image photographed each time may be different. Therefore, the quadrangular images in the different initial images may have slightly different displacements, sizes, and angles of rotation. In this case, based on feature points of rectangular images, alignment needs to be further performed on the rectangular images obtained after correction is performed on the initial images, so as to facilitate a subsequent combination step.

Specifically, if image stitching is performed on all the corrected rectangular images, there is a transformation relationship between at least two quadrangular images, such as translation, rotation, or affine. A transformation matrix may be computed based on a relationship between relative locations of feature points, and after the feature points of the at least two quadrangular images are aligned, the quadrangular images are also aligned. In some embodiments, an alignment process includes the following steps:

(1) Any rectangular image is used as a reference image, and feature point alignment is performed between another rectangular image and the reference image. Feature point extraction is performed on every two rectangular images and includes extraction of a series of feature points. A feature point extraction method may include: scale-invariant feature transform (SIFT), SURF (Speeded Up Robust Features), Harris corner detection, and the like. Other feature point extraction methods known by persons skilled in the art that are applicable to this application can still be included in the idea scope of the present invention through citation.

(2) With reference to FIG. 13a and FIG. 13b, a rectangular image T1 in FIG. 13a is used as a reference image, and alignment is performed on a rectangular image T2 in FIG. 13b. Specifically, matching is performed between feature points of the rectangular image T1 and the rectangular image T2, to find matched feature points X1, X2, X3, and X4, and corresponding X1', X2', X3', and X4'. The matched feature points are abstract marks of pixels, and denote locations in the rectangular images and eigenvalues. The feature points may be location marks such as corners, forks, and edges in the rectangular images.

(3) A relative transformation matrix for the two rectangular images T1 and T2 is computed based on the matched feature points. The relative transformation matrix represents transformation parameters used to perform alignment transformation on each matched feature point, such as rotation, translation, and zooming. For example, in a specific scenario of an embodiment, coordinates of the matched feature points X1, X2, X3, and X4 in the rectangular image T1 are (211, 224), (577, 240), (209, 466), and (545, 511), respectively; coordinates of the matched feature points X1', X2', X3', and X4' in the rectangular image T2 are (213, 215), (579, 261), (192, 450), and (525, 527), respectively; and a corresponding relative transformation matrix is as follows:

$$\begin{bmatrix} 1.039 & 8.526e-02 & -2.551e+01 \\ -7.196e-02 & 1.041 & 1.884e+01 \\ 5.915e-05 & 1.033e-05 & 1.0 \end{bmatrix}$$

(4) Transformation, such as translation, rotation, zooming, and affine, is performed on the rectangular image T2 based on the relative transformation matrix, and the rectangular image T2 is aligned with the rectangular image T1, to form an aligned rectangular image T2'. The rectangular image T1 and the aligned rectangular image T2' are shown in FIG. 13c.

In some embodiments, when a plurality of initial images are photographed, rectangular target edges (including a side and an angle) detected after edge detection is performed on quadrangular images are within an error range, and a corrected aspect ratio is also within an error range. In this case, alignment does not need to be performed on the rectangular images obtained after correction is performed on the initial images.

Next, a definition distribution status of each rectangular image is analyzed; at least one stitching line or fusion region is determined based on the definition distribution status; and based on division by the stitching line, partial images with higher definitions are selected in the rectangular images and are stitched, or in the fusion region, based on definitions of the rectangular images, pixel fusion is performed on corresponding rectangular images, to obtain a clear final image and output the final image. To-be-combined regions may be several stitched regions or a combination of a stitched region and a fusion region.

Figure 14A:
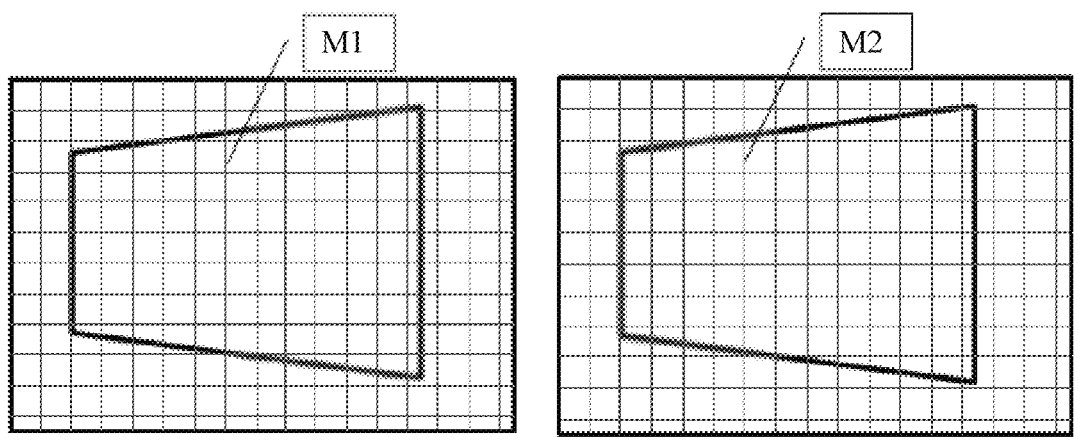
FIG. 14a to FIG. 14g are simplified schematic diagrams of to-be-combined regions obtained through division based on definition distribution of two corrected quadrangular images according to some embodiments.
Figure 14B:
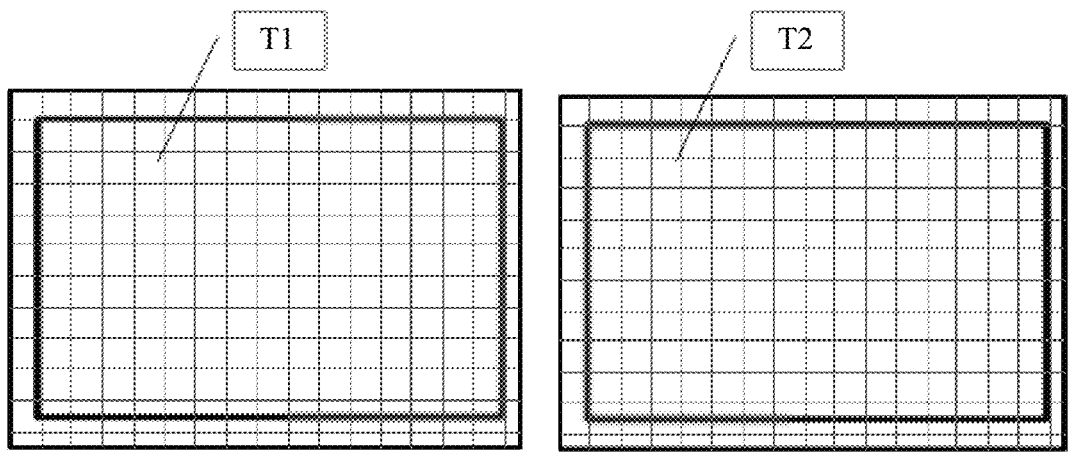

Specifically, rectangle correction and feature alignment are performed on initial images M1 and M2 in FIG. 14a to form two corrected rectangular images T1 and T2 (T1 and T2 may alternatively be aligned rectangular images) in FIG. 14b. Definitions of the rectangular images T1 and T2 shown in FIG. 14b are analyzed to obtain definition curves L1 and L2 shown in FIG. 14c. L1 is a definition curve of the rectangular image T1, and L2 is a definition curve of the rectangular image T2.

Herein, a Brenner gradient function may be used in an image definition evaluation method. Specifically, definition evaluation is performed by calculating a square of a difference between two adjacent pixel grays. The gradient function is defined as follows:

$$D(f)=\Sigma_y\Sigma_x|f(x+2,y)-f(x,y)|^2, \text{ where}$$

f(x, y) represents a gray value of a pixel (x, y) corresponding to an image f, and D(f) is a computation result of an image definition.

In addition, definition evaluation methods (ΔDoM) that are based on a Tenengrad function, a Brenner function, a variance function, a squared gradient function, a Vollath function, a window gradient function, an entropy function, a region contrast, a non-reference image, and the like can be applied to the method described in the present invention.

Figure 14C:
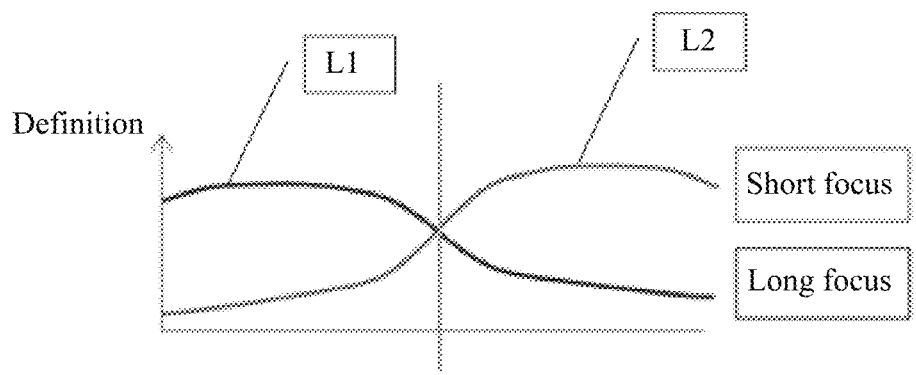
Figure 14D:
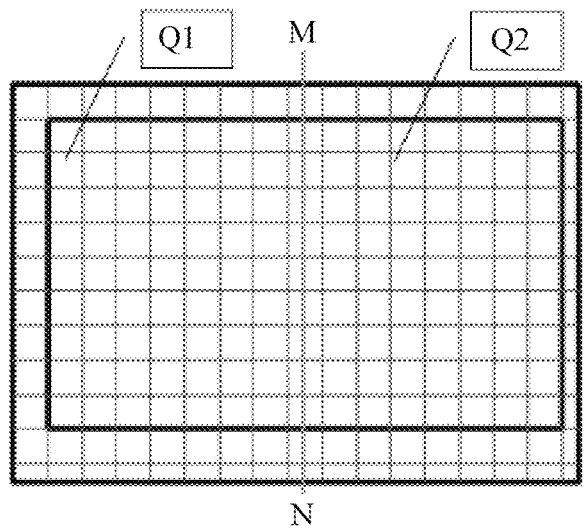

Then, based on FIG. 14b and the definition distribution diagram in FIG. 14c, it can be learnt that the definition distribution curves of the two corrected and aligned rectangular images T1 and T2 are L1 and L2, respectively; and based on locations corresponding to the definition distribution curves L1 and L2, a stitching line MN, shown in FIG. 14d, used to divide a to-be-combined region is generated. FIG. 14d shows a target image obtained by combining the rectangular images T1 and T2. Rectangles in FIG. 14d are the same as the rectangular images T1 and T2 in sizes. Rectangles in an initial diagram of FIG. 14d may be blank, and two to-be-combined regions Q1 and Q2 are obtained by dividing the rectangles in FIG. 14d by using the stitching line MN. Herein, the stitching line is unnecessarily a straight line, and a direction of the stitching line is specifically determined based on the definition distribution.

Next, in the stitched region, regions in rectangular images corresponding to higher definitions may be selected directly and are stitched. That is, a region in a corrected rectangular image corresponding to the definition curve L1 is selected in the to-be-combined region Q2 and a region in a corrected rectangular image corresponding to the definition curve L2 is selected in the to-be-combined region Q2, and the two regions are stitched. A high-definition region and a low-definition region may be obtained by dividing the rectangular images T1 and T2 by using the stitching line MN, and the high-definition region is replicated to a corresponding to-be-combined region; or based on pixel coordinates in the to-be-combined regions obtained through division in FIG. 14d, a pixel value of a pixel whose coordinates are in a high-definition rectangular image is searched for, and is used as a pixel value of a pixel in the to-be-combined region.

Figure 14E:
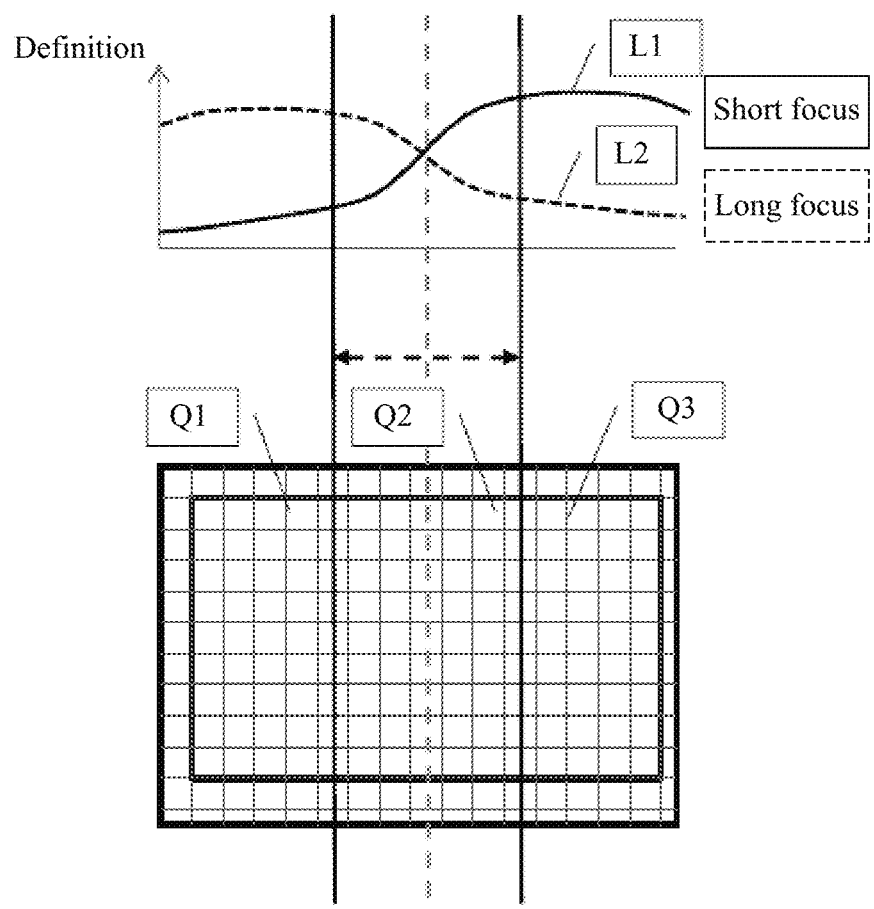

In another embodiment, with reference to FIG. 14e, three to-be-combined regions Q1, Q2, and Q3 are obtained through division based on the definition curves L1 and L2. Because there is a slight definition difference between the definition curves L1 and L2 of two corrected rectangular images that is corresponding to the to-be-combined region Q2, the to-be-combined region Q2 may be determined as a fusion region. In this region, fusion processing is performed based on a definition weight of each pixel in the two corrected rectangular images.

Figure 14F:
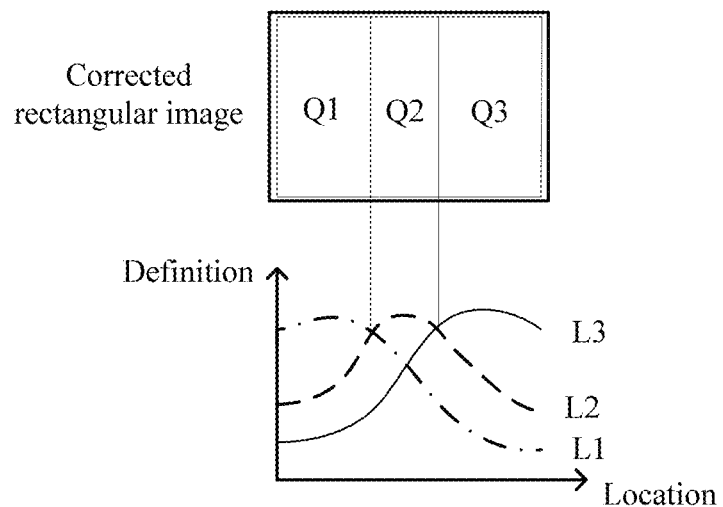

In another embodiment, in FIG. 14f, when there are three corrected rectangular images, definition distribution curves L1, L2, and L3 are obtained, and three to-be-combined regions Q1, Q2, and Q3 are obtained through division based on the three definition distribution curves. During combination, a region in a corrected rectangular image corresponding to the definition curve L1 is selected for the to-be-combined region Q1, a region in a corrected rectangular image corresponding to the definition curve L2 is selected for the to-be-combined region Q2, and a region in a corrected rectangular image corresponding to the definition curve L3 is selected for the to-be-combined region Q3, and the three regions are stitched, to form an image with a higher definition.

Figure 14G:
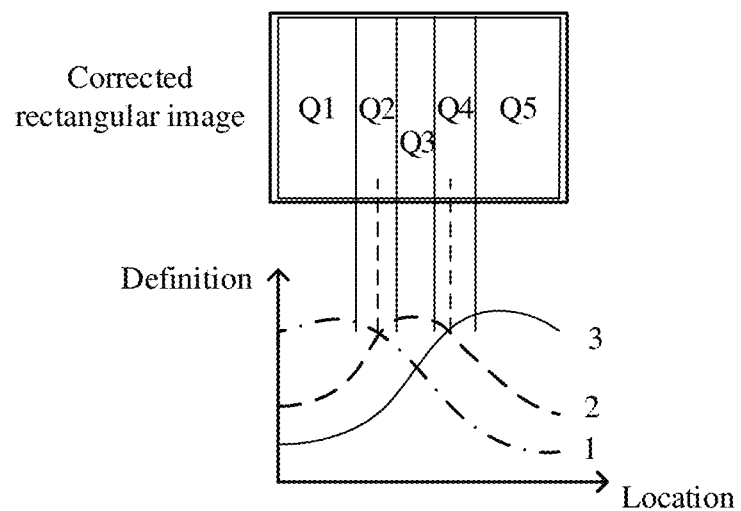

Then, in another embodiment, in FIG. 14g, when there are three corrected rectangular images, definition distribution curves L1, L2, and L3 are obtained, and five to-be-combined regions Q1, Q2, Q3, Q4, and Q5 are obtained through division based on the three definition distribution curves. The to-be-combined regions Q2 and Q4 are determined as fusion regions. The fusion region Q2 is fused based on a rectangular image corresponding to the definition curves L1 and L2; the fusion region Q4 is fused based on a rectangular image corresponding to the definition curves L2 and L3; and regions in corrected rectangular images corresponding to the definition curve L1, the definition curve L2, and the definition L3 are selected for the to-be-combined regions Q1, Q2, and Q3, respectively.

Figure 15:
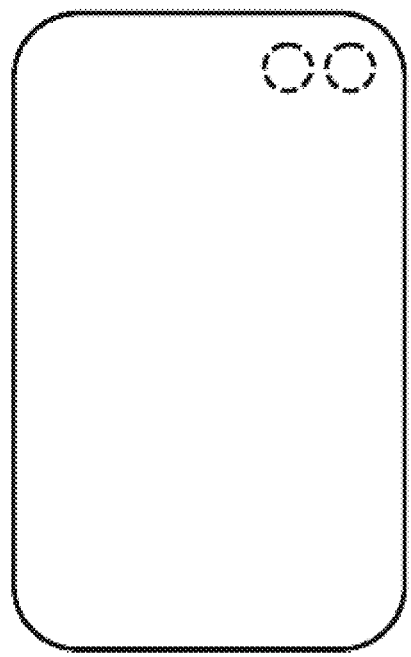
FIG. 15 is a schematic structural diagram of a terminal having two cameras according to some embodiments.

With reference to FIG. 15, according to a method described in an embodiment of this application, when the terminal has at least two cameras, the step of obtaining at least one initial image includes: controlling each of the at least two cameras to photograph at least one initial image based on a different focus.

In a specific embodiment, the terminal is a mobile phone with two same-pixel cameras. A difference between this embodiment and the foregoing embodiment lies in that, in this embodiment, there are two cameras that have same parameters and whose photographing locations are different. Therefore, two initial images can be photographed simultaneously based on different locations focused by the cameras.

Figure 16:
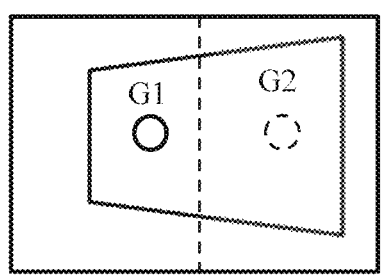
FIG. 16 is a simplified schematic diagram of focus selection during photographing performed by the terminal shown in FIG. 15 according to some embodiments.
Figure 16:
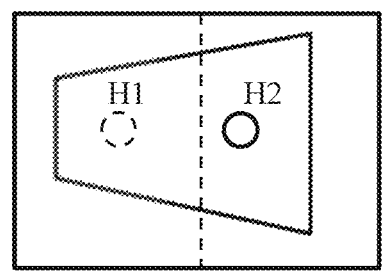

Due to a photographing location difference, a slight aberration exists between the two initial images. As shown in FIG. 16, quadrangular image locations in the initial images obtained by using the two cameras are different. In some embodiments, (a) in FIG. 16 is a preview image corresponding to a camera 1, and two candidate focuses G1 and G2 are computed based on a preset focus selection method. (b) in FIG. 16 is a preview image corresponding to a camera 2, and two candidate focuses H1 and H2 are computed based on the same focus selection method. Because there are two cameras that can be used for focusing, (G1, H2) and (G2, H1) are two candidate focus pairs. Sums or variances of distances between focuses in the two candidate focus pairs and centers of initial images are separately computed, and a candidate focus pair closer to the center is selected, and focuses in the candidate focus pair are used as focuses when the two cameras perform subsequent photographing simultaneously. For example, a location of a preferable focus pair in FIG. 16 is (G1, H2).

Next, the two cameras obtain the initial images simultaneously based on a photographing instruction.

Two corrected rectangular images are obtained through rectangle correction (which is also referred to as keystone correction). Then, a process of alignment, stitching, and fusion is performed on the corrected rectangular images by using the method in the foregoing embodiment.

According to a method in another embodiment of this application, the terminal may alternatively be a mobile phone with two different-pixel cameras. Based on the foregoing embodiment, a parallax exists between preview images obtained by two cameras. However, a resolution is a main factor for determining a focus location.

To increase a resolution of a far-end image, a focus of a high-pixel camera may be determined in a small-end portion of a detected quadrangular image, that is, at a far end of a photographed rectangular target; and a focus of a low-pixel camera may be determined in a large-end portion of a detected quadrangular image, that is, at a near end of the photographed rectangular target.

Resolutions of corrected images on which quadrangle correction is performed are also different. A definition difference is as follows: When definitions of two images are analyzed, both maximums and value ranges of the definitions of the two images differ greatly with each other. Locations with a same definition may be used as a stitching location. Location in images from a high-resolution camera may be preferably used as stitching locations. This embodiment may also be applicable to a method for fusing stitched regions in Embodiment 1, to reduce a sudden image change near a stitching line.

Figure 17:
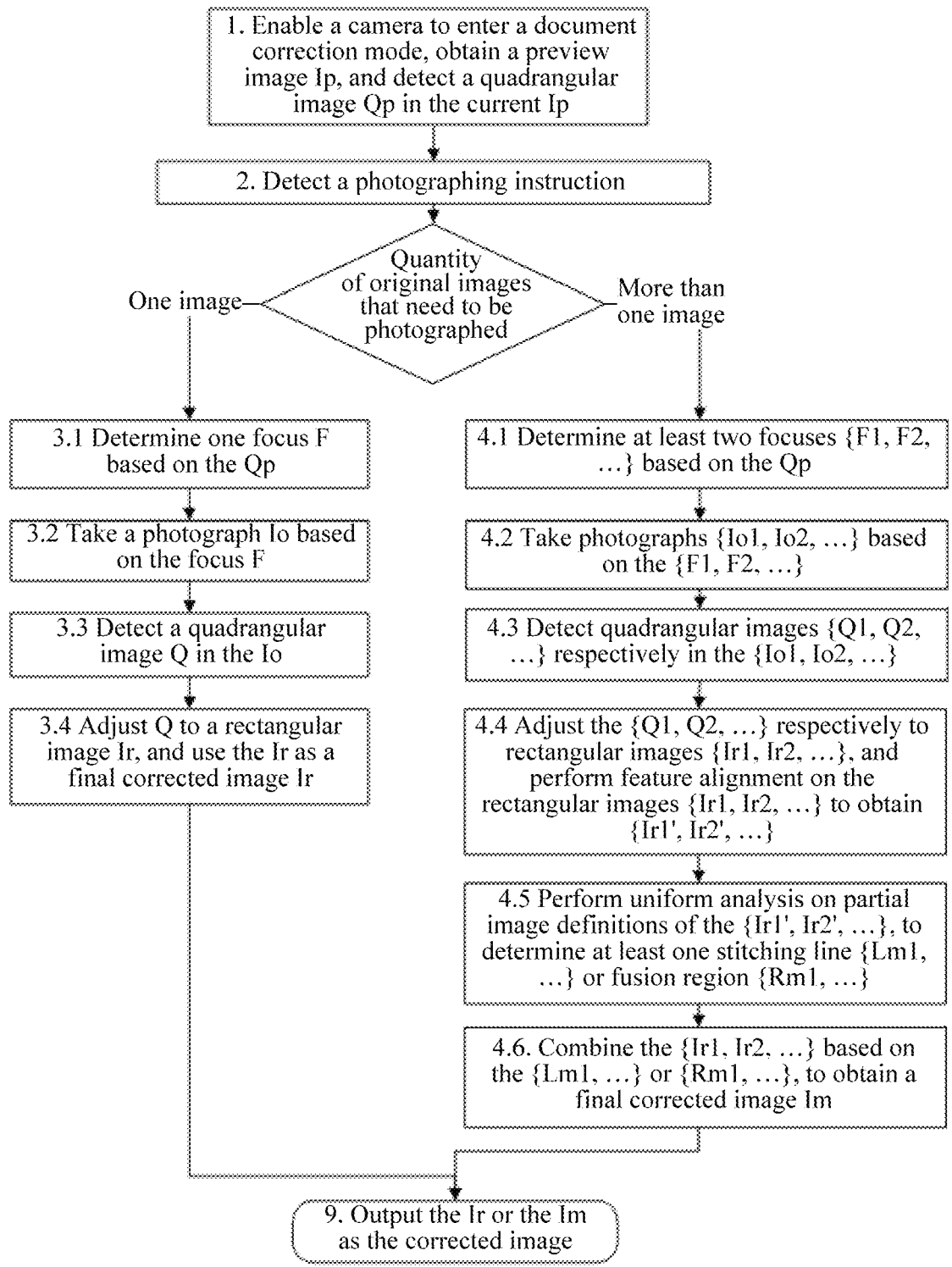
FIG. 17 is a simplified schematic flowchart of image photographing according to some specific embodiments.

With reference to FIG. 17, according to a specific embodiment of the present invention, in a specific scenario, an image photographing method includes the following steps:

1. Enable a camera to enter a document correction mode, obtain a preview image Ip, and detect a quadrangular image Qp in the current Ip.

2. Detect a photographing instruction.

Next, a quantity of original images that need to be photographed is determined. If only one image is to be photographed, the following steps are performed:

3.1 Determine one focus F based on the Qp.

3.2 Take a photograph Io (that is, an initial image) based on the focus F.

3.3 Detect a quadrangular image Q in the Io.

3.4 Adjust Q to a rectangular image Ir, and use the Ir as a final corrected image Ir.

If a plurality of images are to be photographed, the following steps are performed:

4.1 Determine at least two focuses {F1, F2, . . . } based on the Qp.

4.2 Take photographs {Io1, Io2, . . . } (that is, initial images) based on the {F1, F2, . . . }.

4.3 Detect quadrangular images {Q1, Q2, . . . } respectively in the {Io1, Io2, . . . }.

4.4 Adjust the {Q1, Q2, . . . } respectively to rectangular images {Ir1, Ir2, . . . }, and perform feature alignment on the rectangular images {Ir1, Ir2, . . . } to obtain {Ir1', Ir2', . . . }.

4.5 Perform uniform analysis on partial image definitions of the {Ir1', Ir2', . . . }, to determine at least one stitching line {Lm1, . . . } or fusion region {Rm1, . . . }.

4.6. Combine the {Ir1, Ir2, . . . } based on the {Lm1, . . . } or {Rm1, . . . }, to obtain a final corrected image Im.

Finally, the final corrected image Ir or Im that is obtained in step 3.4 or step 4.6 is output as a final image.

Figure 18:
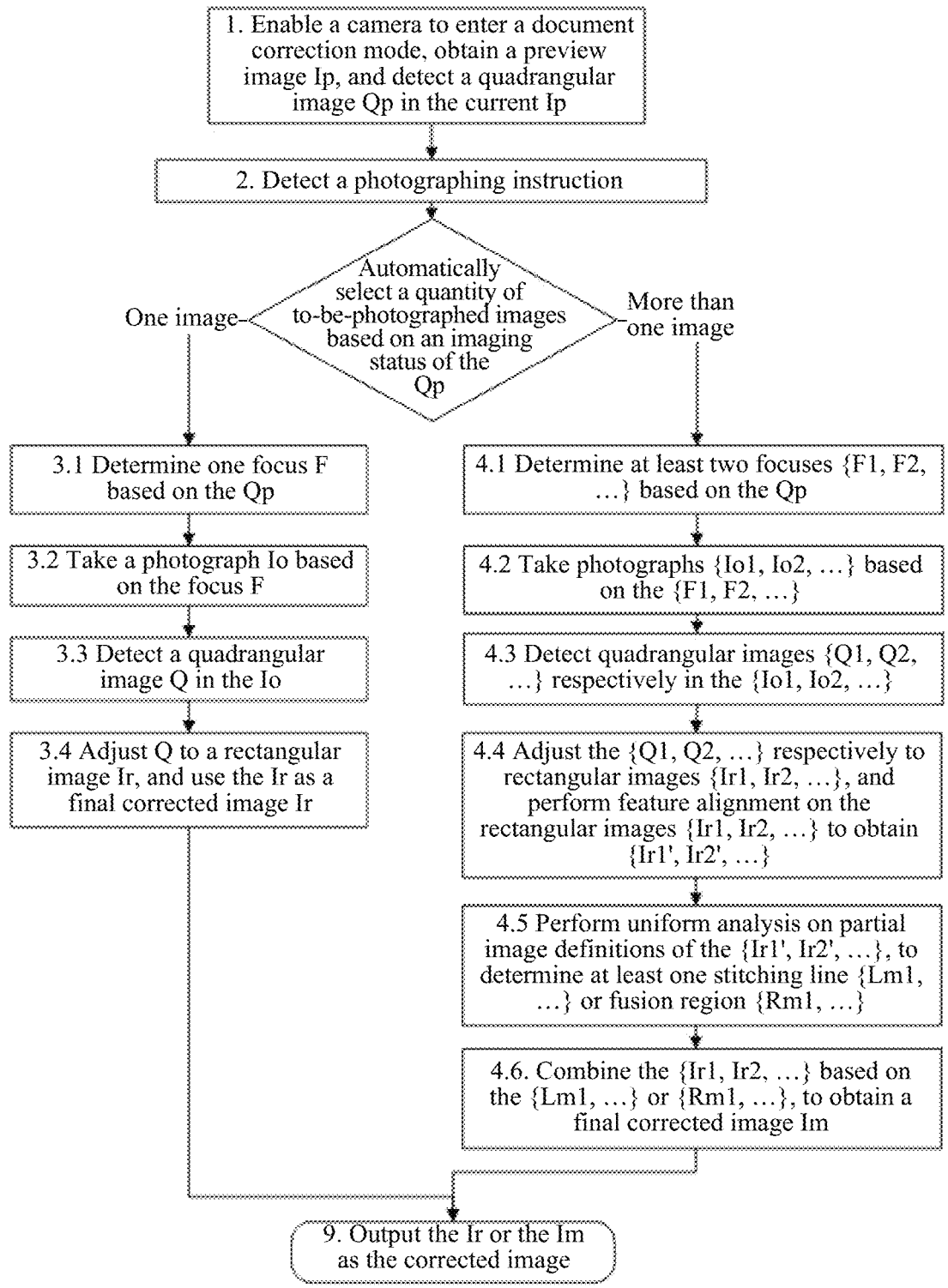
FIG. 18 is a simplified schematic flowchart of image photographing according to some specific embodiments.

With reference to FIG. 18, in another embodiment, based on the specific scenario shown in FIG. 17, a quantity of to-be-photographed images is automatically selected based on an imaging status of the detected quadrangular image in the preview image, such as an included angle between opposite sides or a definition distribution curve. In some embodiments, the quantity of to-be-photographed images can be automatically selected before an initial image is photographed, that is, before the photographing instruction is detected.

Figure 19A:
FIG. 19a to FIG. 19c are schematic diagrams of initial images and a corrected image that are obtained in an image photographing method according to some specific embodiments.
Figure 19B:
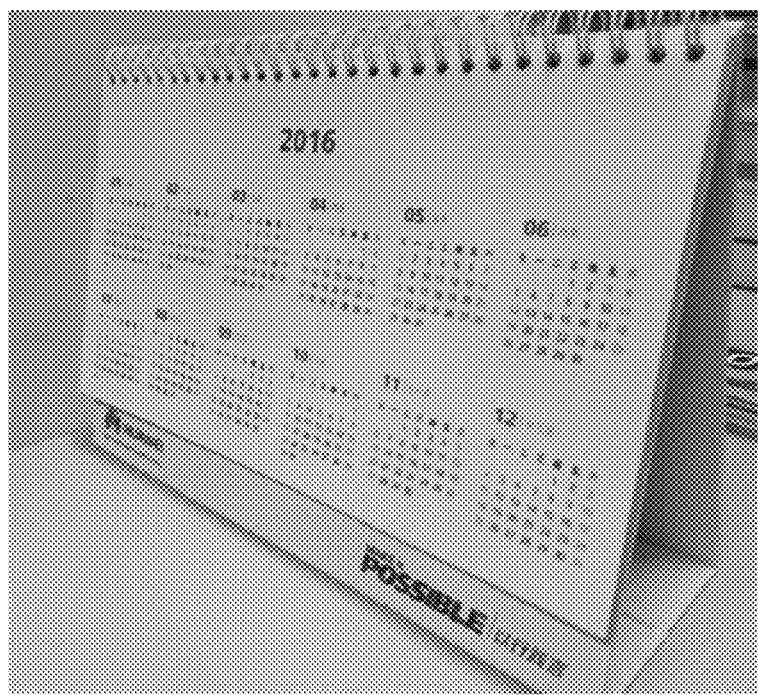
Figure 19C:
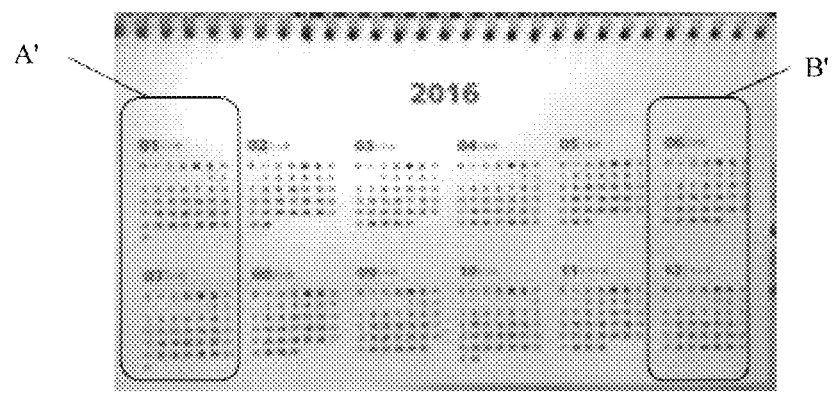

FIG. 19a to FIG. 19c show schematic diagrams of initial images and a final output image that are obtained during a process of image photographing and image processing by using the image photographing method in this application. When a rectangular target is photographed, a quadrangular image is detected in a preview image. A shorter side of two opposite sides with a smaller included angle between opposite sides in the quadrangular image is determined as a first side (corresponding to a far end of the photographed rectangular target). Based on a photographing instruction, a plurality of initial images are photographed. At least one initial image, shown in FIG. 19a, photographed based on a focus that is a point near a partial region including an opposite side of the first side and at least one initial image, shown in FIG. 19b, photographed based on a focus that is a point near a partial region including an opposite side of the first side are obtained. Rectangle correction and combination processing is performed on the initial images to form a final image shown in FIG. 19c. Compared with that in the prior art, a definition of a region A' increases obviously and differs slightly from a definition of a region B'. This increases an overall definition of the final image.

The accompanying drawings described in the embodiments are examples of accompanying drawings for ease of understanding the embodiments. Sizes and proportions of the accompanying drawings are not limited, and a proportion relationship between the accompanying drawings does not indicate a necessary association.

According to an image photographing apparatus in a terminal with a camera provided in some embodiments, the apparatus includes a detection module, a photographing module, a correction module, and an output module. First, the detection module enters a photographing mode, and detects a quadrangular image in a preview image; then, based on a photographing instruction, the photographing module selects at least one focus in the quadrangular image, and photographs at least one initial image based on the at least one focus, where the quadrangular image includes a first pair of opposite sides and a second pair of opposite sides, an included angle between the opposite sides of the first pair of opposite sides is less than that of the second pair of opposite sides, a first side is a shorter side of the first pair of opposite sides, the at least one focus includes a first focus, and the first focus is in the quadrangular image and in a partial region including the first side; next, the correction module adjusts a quadrangular image in each of the at least one initial image to a rectangular image; and finally, the output module obtains a final image based on the rectangular image and outputs the final image.

Figure 20:
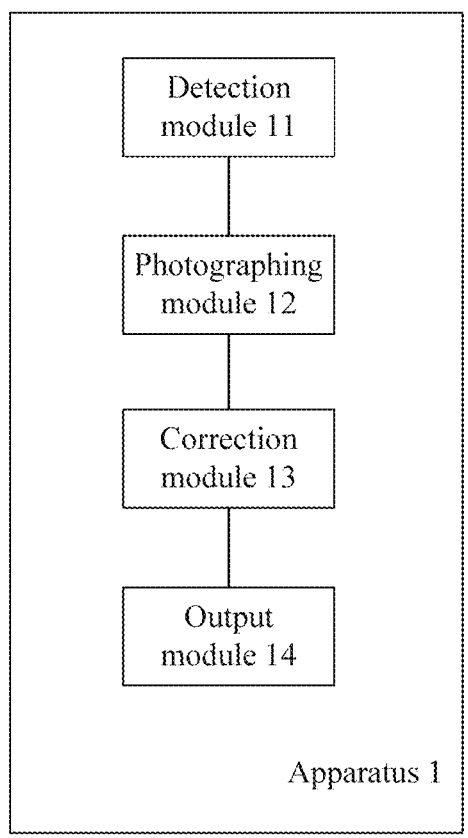
FIG. 20 is a schematic structural diagram of an image photographing apparatus according to some embodiments.

FIG. 20 shows an image photographing apparatus 1 in a terminal with a camera and a plurality of application programs provided in some embodiments. The apparatus 1 includes a detection module 11, a photographing module 12, a correction module 13, and an output module 14. First, the detection module 11 enters a photographing mode, and detects a quadrangular image in a preview image; then, based on a photographing instruction, the photographing module 12 selects at least one focus in the quadrangular image, and photographs at least one initial image based on the at least one focus, where the quadrangular image includes a first pair of opposite sides and a second pair of opposite sides, an included angle between the opposite sides of the first pair of opposite sides is less than that of the second pair of opposite sides, a first side is a shorter side of the first pair of opposite sides, the at least one focus includes a first focus, and the first focus is in the quadrangular image and in a partial region including the first side; next, the correction module 13 adjusts a quadrangular image in each of the at least one initial image to a rectangular image; and finally, the output module 14 obtains a final image based on the rectangular image and outputs the final image.

The image photographing apparatus in the present invention may be applied to a document correction (or referred to as keystone correction) photographing mode, and is used to increase a definition of a corrected image after document correction. An image is input for document correction, and an image is output after document correction. In document correction, a quadrangular image is detected, transformed, and processed, so as to help correct distortion in an image caused by an oblique photographing angle when a user photographs a rectangular target, and finally output a rectangular image. Herein, the rectangular target is generally a rectangular image containing information, for example, a file, an invoice, a book, a business card, a certificate, a handout, a photograph, an advertisement, a display panel, a television, a film, or a screen. Certainly, persons skilled in the art should understand that the foregoing rectangular target is merely an example, and the method provided in this application can be used to photograph any other rectangular objects and perform image correction.

The apparatus may be hardware, software, or a combination of hardware and software that has a processing capability and that is installed on a terminal with a camera and a plurality of application programs. The terminal may be any electronic device incorporating a photographing function and an image processing function. The electronic device may be a mobile phone, a tablet computer, a laptop computer, a digital camera, a projection device, a personal digital assistant (PDA for short), an e-book reader, a wearable device, or the like. This is not further limited in this embodiment of the present invention.

For a specific implementation of the detection module 11, reference is made to the specific content of step S11 shown in FIG. 7, and for an implementation method of the photographing module, reference is made to the specific content of step S12 shown in FIG. 7. For ease of brevity, details are not described again.

Figure 21:
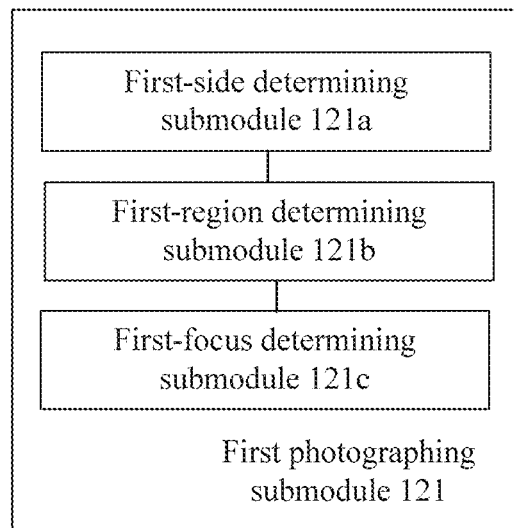
FIG. 21 is a schematic structural diagram of a first photographing submodule according to some embodiments.

As shown in FIG. 21, in some embodiments, the photographing module 12 includes: a first photographing submodule 121, configured to: select the first focus in the quadrangular image, and photograph an initial image based on the first focus. Specifically, the first photographing module 121 includes a first-side determining submodule 12*a*, a first-region determining submodule 121*b*, and a first-focus determining submodule 12*c*. The first-side determining submodule 121*a* determines a first point and a second point respectively on a second side and a third side of the quadrangular image, where the second side and the third side are adjacent to the first side, a distance between the first point and a vertex at which the first side and the second side intersect is less than or equal to a distance between the first point and a vertex at which the second side and a fourth side intersect, a distance between the second point and a vertex at which the first side and the third side intersect is less than or equal to a distance between the second point and a vertex at which the third side and the fourth side intersect, and the fourth side is an opposite side of the first side; the first-region determining submodule 121*b* determines, as the partial region including the first side, a first region formed by connecting the vertex at which the first side and the second side intersect, the vertex at which the first side and the third side intersect, the second point, and the first point in order; and the first-focus determining submodule 121*c* selects a point in the first region as the first focus. For specific implementations of the first-side determining submodule 12*a*, the first-region determining submodule 121*b*, and the first-focus determining submodule 121*c*, reference is made to the content of step S121*a*, step S121*b*, and step S121*c* in the foregoing embodiment and the content of the specific embodiment shown in FIG. 10*a* and FIG. 10*b*. Details are not described again.

For an implementation method of the correction module, reference is made to the specific content of step S13 shown in FIG. 7, and for an implementation method of the output module, reference is made to the specific content of step S14 shown in FIG. 7. For ease of brevity, details are not described again and are inclusive through citation herein.

Subsequently, the output module outputs the rectangular image as the final image by using a first output submodule (not shown in the figure).

In some embodiments, the output module includes a combination submodule 141 and a second output submodule (not shown in the figure).

Figure 22:
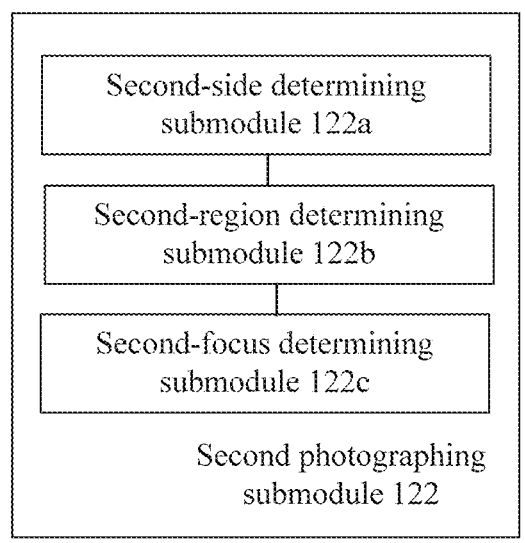
FIG. 22 is a schematic structural diagram of a second photographing submodule according to some embodiments.

With reference to FIG. 20 and FIG. 22, a process performed by the apparatus 11 includes: First, the detection module 12 enters a photographing mode, and detects a quadrangular image in a preview image. Then, the photographing module 12 includes a second photographing submodule 122, and the second photographing submodule 122 selects at least two focuses in the quadrangular image, where the at least two focuses include at least one first focus and at least one second focus, and the second focus is different from the first focus; and photographs at least two initial images based on the at least two focuses respectively. Next, the correction module adjusts a quadrangular image in the initial image to a rectangular image. For an implementation method of the detection module, reference is made to the specific content of step S11' shown in FIG. 12, and for an implementation method of the photographing module, reference is made to the specific content of step S12' shown in FIG. 12. For ease of brevity, details are not described again.

For a specific implementation of selecting the first focus, reference is made to the specific implementation of selecting, by the first photographing submodule, the first focus, as shown in FIG. 21.

In some embodiments, the second focus is a point selected in a partial region including the opposite side of the first side in the quadrangular image. The second photographing submodule includes a second-side determining submodule, a second-region determining submodule, and a second-focus determining submodule. The second-side determining submodule determines a third point and a fourth point respectively on a second side and a third side of the quadrangular image, where the second side and the third side are adjacent to the first side, a distance between the third point and a vertex at which the first side and the second side intersect is greater than or equal to a distance between the third point and a vertex at which the second side and a fourth side intersect, a distance between the fourth point and a vertex at which the first side and the third side intersect is greater than or equal to a distance between the fourth point and a vertex at which the third side and the fourth side intersect, and the fourth side is an opposite side of the first side; the second-region determining submodule determines, as the partial region including the opposite side of the first side, a second region formed by connecting the vertex at which the fourth side and the second side intersect, the vertex at which the fourth side and the third side intersect, the fourth point, and the third point in order; and the second-focus determining submodule selects a point in the second region as the second focus.

The correction module adjusts quadrangular images in the at least two initial images respectively to at least two rectangular images by using a correction submodule. The output module includes a combination submodule and a second output submodule. The combination submodule combines the at least two rectangular images to obtain the final image; and the second output submodule outputs the final image.

In some specific implementations, a quantity of to-be-photographed initial images is not limited, for example, there may be one, two, three, four, or eight to-be-photographed initial images.

In some embodiments, a quantity of to-be-photographed initial images may be preset by a program or determined based on an operation selected by a user. For example, the program automatically sets that two initial images are photographed each time a user enters a photographing instruction (for example, tapping a photographing button). For another example, a prompt for selection is provided for a user each time a document correction photographing mode is entered, so that the user selects a quantity of to-be-photographed initial images, and then the corresponding quantity of initial images are photographed each time the user enters a photographing instruction (for example, tapping a photographing button).

In some embodiments, the quantity of to-be-photographed initial images may be determined based on an imaging status of the quadrangular image in the preview image. The imaging status of the quadrangular image in the preview image may include but is not limited to: an oblique photographing angle case roughly determined based on a deformation degree of the quadrangular image in the preview image, or a difference between definitions of regions after the quadrangular image in the preview image is adjusted to a rectangular image. If an oblique angle of the quadrangular image is relatively small or a difference between definitions of the corrected quadrangular image is relatively small, it is determined that a relatively small quantity of initial images are photographed; if an oblique angle of the quadrangular image is relatively large or a difference between definitions of the quadrangular image is relatively large, it is determined that a relatively large quantity of initial images are photographed, for example, two, four, or even more images are photographed.

In some embodiments, a quantity of to-be-photographed initial images is determined based on an oblique photographing angle. If an oblique photographing angle is relatively large, a quantity of to-be-photographed images is increased, to increase a definition of the initial image. The apparatus further includes a selection module. The selection module determines a quantity of to-be-photographed initial images before the at least one initial image is photographed based on the at least one focus. Further, the selection module includes a selection submodule. The selection submodule determines the quantity of to-be-photographed initial images based on the included angle between the opposite sides of the first pair of opposite sides in the quadrangular image detected in the preview image, or a distribution curve of definitions in a direction from the first side to the opposite side of the first side in the quadrangular image.

Specifically, the oblique photographing angle is predetermined based on an included angle between opposite sides in the quadrangular image or the distribution curve of definitions in the direction from the first side to the opposite side of the first side in the quadrangular image. A quantity determining module determines the quantity of to-be-photographed initial images based on an oblique angle threshold range to which an oblique photographing angle belongs. A larger oblique photographing angle indicates a larger determined quantity of to-be-photographed initial images. For implementation methods of a predetermining module and the quantity determining module, reference is made to a determining process shown in FIG. 8. For ease of brevity, details are not described again.

In some embodiments, a quantity of to-be-photographed initial images is determined based on a user photographing instruction (an instruction for photographing a single image or photographing images continuously). In some embodiments, the photographing module further includes a quantity determining submodule. Before the step of photographing at least two initial images, the quantity determining submodule determines a quantity of to-be-obtained initial images based on a quantity of times that a user successively enters a photographing instruction within a specific time period. For an implementation method of the quantity determining submodule, reference is made to a determining process shown in FIG. 9. For ease of brevity, details are not described again.

In some embodiments, the oblique photographing angle is predetermined for the quadrangular image detected in the preview image based on an included angle between the opposite sides in the quadrangular image detected in the preview image, or a distribution curve of definitions in a direction from the first side to the opposite side of the first side in the quadrangular image. The quantity of to-be-photographed initial images is determined based on an oblique angle threshold range to which an oblique photographing angle belongs. A larger oblique photographing angle may indicate a larger determined quantity of to-be-photographed initial images and a larger difference between definitions of a far end and a near end of a photographed rectangular target. More clear partial regions can be obtained by increasing a quantity of to-be-photographed initial images and by performing photographing based on different focus locations, so that an overall definition of the final image is increased at a subsequent combination stage. In addition, an oblique photographing angle predetermined may be used to determine a quantity of to-be-photographed initial images, and may be further used as a reference for selecting a location of each focus during an initial image photographing process, or the like.

As shown in FIG. 21, in some embodiments, the first photographing module 121 includes the first-side determining submodule 12*a*, the first-region determining submodule 121*b*, and the first-focus determining submodule 12*c*. The first-side determining submodule 121*a* determines the first point and the second point respectively on the second side and the third side of the quadrangular image, where the second side and the third side are adjacent to the first side, the distance between the first point and the vertex at which the first side and the second side intersect is less than or equal to the distance between the first point and the vertex at which the second side and the fourth side intersect, the distance between the second point and the vertex at which the first side and the third side intersect is less than or equal to the distance between the second point and the vertex at which the third side and the fourth side intersect, and the fourth side is the opposite side of the first side; the first-region determining submodule 121b determines, as the partial region including the first side, the first region formed by connecting the vertex at which the first side and the second side intersect, the vertex at which the first side and the third side intersect, the second point, and the first point in order; and the first-focus determining submodule 121c selects the point in the first region as the focus.

For implementation methods of the first-side determining submodule 121a, the first-region determining submodule 121b, and the first-focus determining submodule 121c, reference is made to the content of step S121, step S122, and step S123 in the foregoing embodiment and the content of the specific embodiment shown in FIG. 10a and FIG. 10b. Details are not described again.

As shown in FIG. 22, in some embodiments, the second photographing module 122 includes a second-side determining submodule 122a, a second-region determining submodule 122b, and a second-focus determining submodule 122c. The second-side determining submodule 122a determines the third point and the fourth point respectively on the second side and the third side of the quadrangular image, where the distance between the third point and the vertex at which the first side and the second side intersect is greater than or equal to the distance between the third point and the vertex at which the second side and the fourth side intersect, and the distance between the fourth point and the vertex at which the first side and the third side intersect is greater than or equal to the distance between the fourth point and the vertex at which the third side and the fourth side intersect; the second-region determining submodule 122b determines, as the partial region including the opposite side of the first side, the second region formed by connecting the vertex at which the fourth side and the second side intersect, the vertex at which the fourth side and the third side intersect, the fourth point, and the third point in order; and the second-focus determining submodule 122C selects at least one point in the second region as the second focus.

The implementation methods of the second-side determining submodule 122a, the second-region determining submodule 122b, and the second-focus determining submodule 122c are similar to those of the first-side determining submodule 12a, the first-region determining submodule 121b, and a first-focus determining submodule 12c. For ease of brevity, details are not described again.

Figure 23:
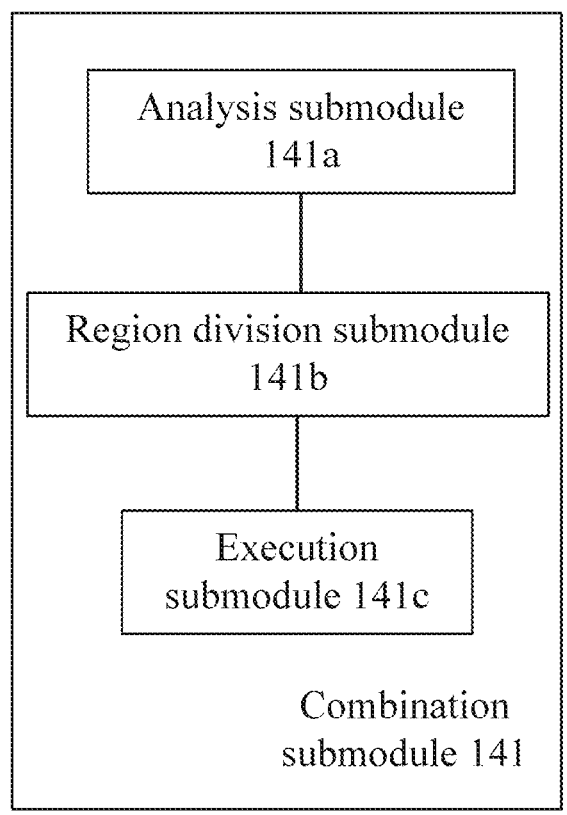
FIG. 23 is a schematic structural diagram of a combination submodule according to some embodiments.

Next, with reference to FIG. 23, the output module 14 includes a combination submodule 141. The combination submodule 131 combines the plurality of rectangular images to obtain a final image.

As shown in FIG. 23, in some embodiment, the combination submodule 141 includes an analysis submodule 141a, a region division submodule 141b, and an execution submodule 141c. The analysis submodule 141a performs definition analysis and feature point alignment on the rectangular images. The region division submodule 141b determines, based on distribution of definitions of each aligned rectangular image, several to-be-combined regions. The combination submodule 141c combines the to-be-combined regions based on the definitions of each rectangular image. For implementation methods of the analysis submodule, the region division submodule, and the combination submodule, reference is made to the specific content of step S141a, step S141b, and step S141c in the foregoing embodiment. For ease of brevity, details are not described again.

In some embodiments, the execution submodule includes a first combination subunit (not shown in the figure) and/or a second combination subunit (not shown in the figure). The first combination subunit obtains, from each rectangular image, one region with a highest definition corresponding to the to-be-combined region, and stitches the obtained regions to obtain the final image. The second combination subunit obtains, from each rectangular image, at least two regions with higher definitions corresponding to the to-be-combined region, and performs pixel fusion based on definition weights, to obtain the final image. For an embodiment of a combination process of the first combination subunit and/or the second combination subunit, reference is made to FIG. 14a to FIG. 14c and the corresponding descriptions. Details are not described again.

If the terminal has at least two cameras, the photographing module includes a control submodule. The control submodule controls each camera to photograph at least one initial image based on a different focus. For a specific implementation method of the control submodule, reference is made to FIG. 15 and FIG. 16 and the corresponding descriptions. Details are not described again.

The terms used in the embodiments of the present invention are merely for the purpose of illustrating specific embodiments, and are not intended to limit the present invention. The terms "a", "said" and "the" of singular forms used in the embodiments and the following claims of the present invention are also intended to include plural forms, unless otherwise specified in the context clearly. It should also be understood that, the term "and/or" used in this specification indicates and includes any or all possible combinations of one or more associated listed items.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory and an optical memory) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, persons skilled in the art can make various modifications and variations to this application without departing from the spirit and scope of this application. This application is intended to cover these modifications and variations of this application provided that they fall within the scope defined by the following claims and equivalent technologies of this application.

In conclusion, the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An image photographing method for a terminal with a camera, the method comprising:
   entering a photographing mode and detecting a quadrangular image in a preview image, wherein the quadrangular image comprises a first pair of opposite sides and a second pair of opposite sides, wherein an included angle between the first pair of opposite sides is less than an included angle between the second pair of opposite sides, and wherein a first side is a shorter side of the first pair of opposite sides;
   based on a photographing instruction, selecting at least one focus in the quadrangular image, wherein the at least one focus comprises a first focus, and wherein the first focus is in the quadrangular image and in a partial region comprising the first side;
   photographing at least one initial image based on the at least one focus,
   wherein selecting the at least one focus in the quadrangular image and photographing the at least one initial image based on the at least one focus comprise selecting the first focus in the quadrangular image, and photographing an initial image based on the first focus, and wherein selecting the first focus in the quadrangular image comprises:
      determining a first point and a second point respectively on a second side and a third side of the quadrangular image, wherein the second side and the third side are adjacent to the first side, wherein a distance between the first point and a vertex at which the first side and the second side intersect is less than or equal to a distance between the first point and a vertex at which the second side and a fourth side intersect, wherein a distance between the second point and a vertex at which the first side and the third side intersect is less than or equal to a distance between the second point and a vertex at which the third side and the fourth side intersect, and wherein the fourth side is an opposite side of the first side;
      determining, as the partial region comprising the first side, a first region formed by connecting the vertex at which the first side and the second side intersect, the vertex at which the first side and the third side intersect, the second point, and the first point in order; and
      selecting a point in the first region as the first focus;
   adjusting the quadrangular image in each of the at least one initial image to a rectangular image;
   obtaining a final image based on the rectangular image; and
   outputting the final image.

2. The method according to claim 1, wherein selecting the point in the first region as the first focus comprises either:
   selecting an intersection point of diagonals of the first region as the first focus; or
   selecting an intersection point of lines connecting midpoints of opposite sides of the first region as the first focus.

3. The method according to claim 1, wherein obtaining the final image based on the rectangular image and outputting the final image comprise:
   outputting the rectangular image as the final image.

4. The method according to claim 1, wherein selecting the at least one focus in the quadrangular image and photographing the at least one initial image based on the at least one focus comprise:
   selecting at least two focuses in the quadrangular image, wherein the at least two focuses comprise at least one first focus or at least one second focus, and wherein the at least one second focus is different from the at least one first focus; and
   photographing at least two initial images based on the at least two focuses respectively.

5. The method according to claim 4, wherein selecting at least two focuses in the quadrangular image comprises:
   selecting, as a second focus of the at least one second focus, a point in a partial region comprising fourth side.

6. The method according to claim 5, wherein selecting, as a second focus of the at least one second focus, in a partial region comprising the fourth side comprises:
   determining a third point and a fourth point respectively on the second side and the third side of the quadrangular image, wherein the second side and the third side are adjacent to the first side, wherein a distance between the third point and the vertex at which the first side and the second side intersect is greater than or equal to a distance between the third point and the vertex at which the second side and the fourth side intersect, and wherein a distance between the fourth point and the vertex at which the first side and the third side intersect is greater than or equal to a distance between the fourth point and the vertex at which the third side and the fourth side intersect;
   determining, as the partial region the fourth first side, a second region formed by connecting the vertex at which the second side and the fourth side intersect, the vertex at which the third side and the fourth side intersect, the fourth point, and the third point in order; and
   selecting a point in the second region as the second focus of the at least one second focus.

7. The method according to claim 4,
wherein adjusting the quadrangular image in each of the at least one initial image to the rectangular image comprises:
adjusting quadrangular images in the at least two initial images respectively to at least two rectangular images, and
wherein obtaining the final image based on the rectangular image and outputting the final image comprises:
combining the at least two rectangular images to obtain the final image.

8. The method according to claim 7, wherein combining the at least two rectangular images to obtain the final image comprises:
performing feature point alignment on the at least two rectangular images;
determining, based on distribution of definitions of each aligned rectangular image, a plurality of to-be-combined regions in the final image; and
combining the to-be-combined regions based on definitions of each rectangular image to obtain the final image.

9. The method according to claim 8, wherein combining the to-be-combined regions to obtain the final image comprises either:
obtaining, from each rectangular image, one region with a highest definition corresponding to the to-be-combined region, and stitching the obtained regions to obtain the final image; or
obtaining, from each rectangular image, at least two regions corresponding to the to-be-combined region, and performing pixel fusion based on definition weights, to obtain the final image.

10. The method according to claim 4, wherein the terminal has at least two cameras, and wherein photographing at least one initial image based on the at least one focus comprises:
controlling each camera to photograph at least one initial image based on a different focus.

11. The method according to claim 1, further comprising:
before photographing at least one initial image based on the at least one focus, determining a quantity of to-be-photographed initial images.

12. The method according to claim 11, wherein determining the quantity of to-be-photographed initial images comprises:
determining the quantity of to-be-photographed initial images based on either the included angle between the first pair of opposite sides in the quadrangular image detected in the preview image, or a distribution curve of definitions in a direction from the first side to the fourth side.

13. A terminal comprising:
at least one camera;
one display;
a non-transitory memory comprising instructions;
at least one processor in communication with the memory, wherein the at least one processor execute instructions to:
enter a photographing mode and detect a quadrangular image in a preview image,
wherein the quadrangular image comprises a first pair of opposite sides and a second pair of opposite sides, wherein an included angle between the first pair of opposite sides is less than an included angle between the second pair of opposite sides, and a first side is a shorter side of the first pair of opposite sides;
based on a photographing instruction, select at least one focus in the quadrangular image, wherein the at least one focus comprises a first focus, and wherein the first focus is in the quadrangular image and in a partial region comprising the first side;
photograph at least one initial image based on the at least one focus,
wherein the instructions to select the at least one focus in the quadrangular image and to photograph the at least one initial image based on the at least one focus comprise the instructions to select the first focus in the quadrangular image and to photograph an initial image based on the first focus, and wherein the instruction to select the first focus in the quadrangular image comprises instructions to:
determine a first point and a second point respectively on a second side and a third side of the quadrangular image, wherein the second side and the third side are adjacent to the first side, wherein a distance between the first point and a vertex at which the first side and the second side intersect is less than or equal to a distance between the first point and a vertex at which the second side and a fourth side intersect, wherein a distance between the second point and a vertex at which the first side and the third side intersect is less than or equal to a distance between the second point and a vertex at which the third side and the fourth side intersect, and wherein the fourth side is an opposite side of the first side;
determining, as the partial region comprising the first side, a first region formed by connecting the vertex at which the first side and the second side intersect, the vertex at which the first side and the third side intersect, the second point, and the first point in order; and
selecting a point in the first region as the first focus;
adjust the quadrangular image in each of the at least one initial image to a rectangular image;
obtain a final image based on the rectangular image; and
output the final image.

14. The terminal according to claim 13, wherein the instruction to select a point in the first region as the first focus comprises either an instruction to:
select an intersection point of diagonals of the first region as the first focus; or
select an intersection point of lines connecting midpoints of opposite sides of the first region as the first focus.

15. The terminal according to claim 13, wherein the instructions to obtain the final image based on the rectangular image and to output the final image comprise:
an instruction to output the rectangular image as the final image.

16. The terminal according to claim 13, wherein the instructions to select the at least one focus in the quadrangular image and to photograph the at least one initial image based on the at least one focus comprise:
an instruction to select at least two focuses in the quadrangular image, wherein the at least two focuses comprise at least one first focus and at least one second focus, and wherein the at least one second focus is different from the at least one first focus;
instructions to photograph at least two initial images based on the at least two focuses respectively.

17. An image photographing method for a terminal with a camera, the method comprising:
    entering a photographing mode and detecting a quadrangular image in a preview image,
    wherein the quadrangular image comprises a first pair of opposite sides and a second pair of opposite sides, wherein an included angle between the first pair of opposite sides is less than an included angle between the second pair of opposite sides, and wherein a first side is a shorter side of the first pair of opposite sides;
    based on a photographing instruction, selecting at least two focuses in the quadrangular image, wherein the at least two focuses comprise a first focus, and wherein selecting the first focus comprises:
        determining first point and a second point respectively on a second side and a third side of the quadrangular image, wherein the second side and the third side are adjacent to the first side, wherein a distance between the first point and a vertex at which the first side and the second side intersect is greater than or equal to a distance between the first point and a vertex at which the second side and a fourth side of the quadrangular image intersect, wherein a distance between the second point and a vertex at which the first side and the third side intersect is greater than or equal to a distance between the second point and a vertex at which the third side and the fourth side intersect, and wherein the fourth side is an opposite side of the first side;
        determining, as a partial region, a region formed by connecting the vertex at which the second side and the fourth side intersect, the vertex at which the third side and the third fourth side intersect, the second point, and the first point in order; and
        selecting a point in the formed region as the first focus;
    photographing at least two initial images based on the at least two focuses;
    adjusting quadrangular images in each of the at least two initial images to at least two rectangular images;
    obtaining a final image based on the at least two rectangular images; and
    outputting the final image.

18. The method according to claim 17, wherein the partial region comprises the fourth side.

19. The method according to claim 17,
    wherein obtaining the final image based on the at least two rectangular images and outputting the final image comprises:
    combining the at least two rectangular images to obtain the final image.

20. The method according to claim 17, wherein the terminal has at least two cameras, and wherein photographing the at least two initial images based on the at least two focuses comprises:
    controlling each camera to photograph at least one initial image based on a different focus.

* * * * *

UNITED STATES PATENT AND TRADEMARK OFFICE
CERTIFICATE OF CORRECTION

PATENT NO. : 10,863,077 B2
APPLICATION NO. : 16/332701
DATED : December 8, 2020
INVENTOR(S) : Chao Qin et al.

Page 1 of 1

It is certified that error appears in the above-identified patent and that said Letters Patent is hereby corrected as shown below:

In the Claims

In Column 34, Line 60, Claim 6, delete "region the fourth" and insert --region comprising the fourth--.

In Column 36, Line 65, Claim 16, delete "one first focus;" and insert --one first focus; and--.

In Column 37, Line 15, Claim 17, delete "determining first point" and insert --determining a first point--.

In Column 38, Line 4, Claim 17, delete "the third fourth side" and insert --the fourth side--.

Signed and Sealed this
Sixth Day of April, 2021

Drew Hirshfeld
*Performing the Functions and Duties of the
Under Secretary of Commerce for Intellectual Property and
Director of the United States Patent and Trademark Office*